(12) United States Patent
Ye et al.

(10) Patent No.: US 8,605,048 B2
(45) Date of Patent: Dec. 10, 2013

(54) METHOD AND APPARATUS FOR CONTROLLING MULTIMEDIA CONTENTS IN REALTIME FASHION

(75) Inventors: Zhou Ye, Foster City, CA (US);
Pei-Chuan Liu, Taipei (TW); San-Yuan Huang, Taipei (TW); Yun-Fei Wei, Taipei (TW); Ying-Ko Lu, Taoyuan County (TW)

(73) Assignee: Bluespace Corporation, Apia (WS)

( * ) Notice: Subject to any disclaimer, the term of this patent is extended or adjusted under 35 U.S.C. 154(b) by 163 days.

(21) Appl. No.: 13/184,584

(22) Filed: Jul. 18, 2011

(65) Prior Publication Data

US 2012/0113029 A1    May 10, 2012

Related U.S. Application Data

(60) Provisional application No. 61/410,371, filed on Nov. 5, 2010.

(51) Int. Cl.
*G06F 3/041* (2006.01)

(52) U.S. Cl.
USPC ........................................... 345/173

(58) Field of Classification Search
USPC ............ 345/173; 709/203, 238; 725/100, 109, 725/115; 482/8
See application file for complete search history.

(56) References Cited

U.S. PATENT DOCUMENTS

| | | | |
|---|---|---|---|
| 6,203,432 B1 | 3/2001 | Roberts | |
| 6,351,991 B1 | 3/2002 | Sinha | |
| 7,628,730 B1* | 12/2009 | Watterson et al. | 482/8 |
| 7,789,800 B1* | 9/2010 | Watterson et al. | 482/8 |
| 8,065,710 B2* | 11/2011 | Malik | 725/109 |
| 8,370,888 B2* | 2/2013 | Zimmermann et al. | 725/115 |
| 2003/0059014 A1* | 3/2003 | Ross et al. | 379/201.01 |
| 2005/0229222 A1* | 10/2005 | Relan et al. | 725/100 |
| 2007/0066394 A1 | 3/2007 | Ikeda | |
| 2007/0072680 A1 | 3/2007 | Ikeda | |
| 2008/0022012 A1* | 1/2008 | Wang | 709/238 |
| 2008/0254821 A1 | 10/2008 | Kusuda | |
| 2009/0062005 A1 | 3/2009 | Lu | |
| 2011/0071003 A1* | 3/2011 | Watterson et al. | 482/8 |
| 2011/0276624 A1* | 11/2011 | Akhtar et al. | 709/203 |

FOREIGN PATENT DOCUMENTS

| | | |
|---|---|---|
| JP | 2004220133 A | 8/2004 |
| JP | 2005267257 A | 9/2005 |
| JP | 200631307 A | 2/2006 |
| JP | 3133600 U | 6/2007 |

\* cited by examiner

*Primary Examiner* — Fred Tzeng
(74) *Attorney, Agent, or Firm* — Ding Yu Tan

(57) ABSTRACT

The present invention discloses a method for controlling in realtime fashion multimedia contents on a second screen at a TX side from a first screen at a RX side. The method comprising: detecting at least one touch signal via the first screen, and converting the at least one touch signal into touch data associated with a first position information defining a virtual operation on the first screen corresponding to an actual operation on the second screen, the first position information being with respect to a first coordinate system of the first screen; transmitting the touch data of the RX side to the TX side via the network communication, and calculating at the TX side a second position information with respect to a second coordinate system of the second screen based on the first position information; and performing the actual operation at the second screen based on the second position information.

20 Claims, 17 Drawing Sheets

METHOD AND APPARATUS FOR CONTROLLING MULTIMEDIA CONTENTS IN REALTIME FASHION

CROSS REFERENCE TO RELATED APPLICATIONS

This application claims the benefit of U.S. Provisional Application No. 61/410,371, filed on Nov. 5, 2010 and entitled "INTERACTIVE ELECTRONIC APPARATUS WITH AN ENHANCED DATA TRANSMISSION MODULE", the contents of which are incorporated herein by reference.

BACKGROUND OF THE INVENTION

1. Field of the Invention

The present invention relates to a method and an apparatus for controlling multimedia contents in realtime fashion, and more particularly, to a method and an apparatus for controlling multimedia contents in realtime fashion by means of using wireless touch, motion sensing and battery charging.

2. Description of the Prior Art

As the technology related to portable electronic device advances and the need for portability increases in relation to the current market trend, traditional personal computers are transforming to lighter and more dedicated devices provided for or targeted at different purposes and user groups including such as gaming, telecommunication, web browsing and media streaming. Such shift of market and technology trends related to advanced needs of portability and interactions demanded by users of such electronic devices are in fact facilitating not only the improvement of traditional personal computers, laptops or smart-phones to be more powerful and/or integrated with more features and functions than ever but also a new category or breed of portable electronic devices with more dedicated functions for certain purposes and greater portability at the same time.

In view of the merits of greater portability as well as interaction provided by such newly evolved breed of electronic devices previously mentioned, the inventor realizes that electronic designers and manufacturers are introducing a "lighter" version of portable personal computers or laptop to the market while telecommunication device designers and manufacturers are, in general, offering a "heavier" version of mobile phones such as smart-phones such that the new growing market and user demand of high portability as well as interactive functions may be fulfilled. Some known examples of such new breed of devices may include: iPad by Apple®, Playbook by RIM®, Cius by CISCO®, Galaxy Tab by Samsung®, Libretto by Toshiba®; and examples of known smart phones may be: iPhone by Apple®, Blackberry Bold by RIM®, Galaxy S by Samsung®, HD7 by HTC™. In general, these portable devices share some common building blocks of traditional personal computers but with greater portability in terms of their size, weight as well as with greater interactive and integrated functions with more dedicated applications and telecommunication capabilities including via such as known 3G, 4G or Wi-Fi™.

As such new breed of portable electronic devices are being introduced to the market, the inventor also realizes that each one of such devices may be operated under a specific platform or OS that may be unique from each other, which may be good in providing varieties to the market in general but may too raise a preference issue to the user depending on his/her own demands in terms of such as function, design or performance of different operating systems and devices. Instead of choosing one particular type of portable electronic device running a certain type of operating systems including such as Windows® by Microsoft®, iOS® by Apple®, Android® or Linux® by Google®, Blackberry® OS by RIM®, the inventor realizes an user may advantageously be provided with an universal apparatus capable of communicating with the any example of new breed of electronic devices running any certain type of operating systems and may be advantageously free from the preference selection issue while still being able to utilize or interact with the any one such new breed of electronic devices running different type of operating systems.

However, there are at least two major concerns to be considered in providing an electronic apparatus capable of advantageously communicating and interacting with the newly introduced breed of portable electronic devices, one is related to the various different platforms or operating systems being adapted by different electronic devices and the other is to preserve the merits of great portability and being light in terms of operation and hardware structures or components of portable electronic devices demanded by the market trend. Therefore, there is a need to provide an electronic apparatus capable of communicating with external device (s) of various types of operating systems while preserving a relatively "light" hardware structures to provide a highly portable and interactive devices to users.

Furthermore, as previously mentioned that portable devices are integrated with more functions to be easily accessed by and interacted with users for more dedicated purposes or services including such as gaming, web browsing, teleconferencing and navigation. The inventor realizes that in order to provide an electronic apparatus capable of communicating with external devices of various of different operating systems offering more dedicated services or applications, the most accessible functions or main services of the communicated external devices shall be preferably preserved, controlled and/or interacted by users while preserving a relatively less hardware structures to provide a highly portable and interactive devices to users.

In view of the foregoing, it is desirable to provide an electronic apparatus capable of communicating with external device (s) of various of different types of operating systems such that applications and services of the connected/communicated external device of different types of operating systems in relation to such as interactive gaming, teleconferencing, web browsing, media playing, navigation, image displaying or taking may all be preserved or advantageously made available, and preferably with enhanced data transmission, while realizing or having a relatively "light" hardware structures with great portability and interactive feasibility to users.

SUMMARY OF THE INVENTION

In order to solve the existing problem in the prior art, the present invention provides a method and apparatus for controlling multimedia contents in realtime fashion.

In one aspect, the present invention provides a method for controlling multimedia contents in realtime fashion by means of wireless touch between a transmit (TX) side and a receive (RX) side. The method comprises the steps of: detecting a touch signal via a first screen on the RX side and converting the touch signal into touch data; transmitting and calculating the touch data from the RX side to the TX side via the network communication; and performing an actual operation based on the calculation, so as to allow the RX side to control in realtime fashion the multimedia contents at the TX side.

In an embodiment, the aforementioned multimedia contents is compressed at a compression ratio on the TX side and decompressed at a decompressed ratio determined by the compression ratio on the RX side.

In an embodiment, the aforementioned method further comprises the steps of: detecting a bandwidth of the network communication so as to determine the compression and decompression ratios of the multimedia content.

In another aspect, the present invention provides a method for controlling multimedia contents in realtime fashion by means of using motion sensing between a transmit (TX) side and a receive (RX) side. The method comprises the steps of: detecting a motion event from a motion sensor (RX); transmitting a sensor data (RX) based on the motion event (RX) to the TX side via a wireless network communication; and disabling sensor data generated from a motion sensor (TX side) if the detecting event (RX) exists and then converting the received sensor data (RX side) to motion data at the TX side, so as to present the multimedia contents in a same particular orientation simultaneously on the TX and RX sides.

In an embodiment, the aforementioned particular orientation is a portrait or landscape orientation. Besides, the motion data includes a translation representative of linear acceleration in three-axis directions. Besides, the motion data also includes an angular rotation representative of Yaw, Roll and Pitch in three-axis directions. Besides, the motion sensor (RX or TX) can be one of an accelerometer, a gyroscope and a magnetic compass, or any combination thereof. Besides, the motion sensor (RX) has multiple sensing ranges or a unique sensing range.

In an embodiment, the aforementioned method further comprises the steps of: detecting whether a switch signal is invoked by a switch element (RX) operative to a user, and issuing an adjustment signal to a motion chip (RX) in response to the invoked switch signal; selecting one of multiple sensing ranges at the motion chip (RX) based on the adjustment signal; and generating the motion data based on the selected sensing range, so as to present the multimedia contents in the same particular orientation simultaneously on the TX and RX sides.

In an embodiment, the aforementioned method further comprises the steps of: detecting whether a switch signal is invoked by an application program (TX), and issuing an adjustment signal to a motion chip (RX) in response to the invoked switch signal; selecting one of multiple sensing ranges of the motion chip (RX) based on the adjustment signal; and generating the motion data for the motion chip (RX) based on the selected sensing range, so as to present the multimedia contents in the same particular orientation simultaneously on the TX and RX sides.

In an embodiment, the aforementioned method further comprises the steps of: detecting whether a switch signal is invoked by an application program (TX), and issuing an adjustment signal in response to the invoked switch signal; and adjusting a threshold value of the application program (TX) or a magnitude of the motion data, so as to present the multimedia contents in the same particular orientation simultaneously on the TX and RX sides.

In still another aspect, the present invention provides a method for controlling multimedia contents in realtime fashion by means of using bi-directional battery charging between a transmit (TX) side and a receive (RX) side. The method comprises the steps of: detecting an event of a charging connection between the TX and RX sides; retrieving each remaining battery amount respectively from the TX and RX sides; comparing each remaining battery amount with its own predetermined battery capacity percentage so as to determine an appropriate charging operation.

In an embodiment, the aforementioned method further comprises the step of: presenting a user interface to allow a user's selection of battery charging so that the user may choose one option of using Pad to charge Cellphone, or another option of using Cellphone to charge Pad.

This Summary is not intended to identify key features or essential features of the claimed subject matter, nor is it intended to be used to limit the scope of the claimed subject matter.

BRIEF DESCRIPTION OF THE DRAWINGS

Embodiments of the present invention will now be described, by way of example, with reference to the accompanying drawings, in which:

FIG. 3B is further provided with a switch element for adjusting motion sensitivity according to another alteration of the present invention.

DETAILED DESCRIPTION

Figure 1A:
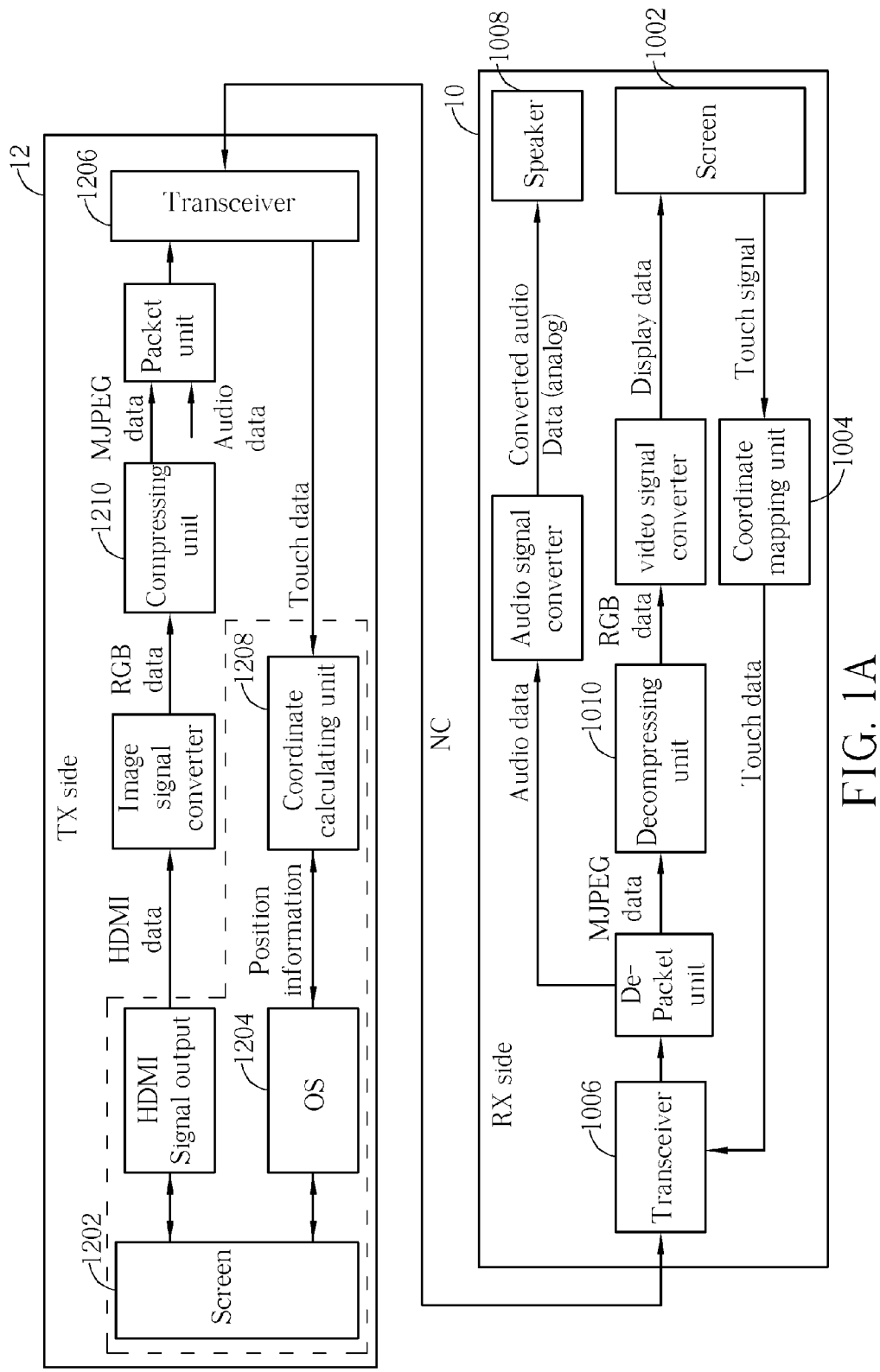
FIG. 1A is a schematic diagram showing wireless control from a RX side over a TX side according to an embodiment of the present invention.

Refer to FIG. 1A, which is a schematic diagram of a RX side 10 (e.g. pad-like device having a touch-control display) and a TX side 12 (e.g. phone-like device having a computing power & operating system therein) according to an embodiment of the present invention. Advantageously, the RX side 10 is provided for controlling in realtime fashion multimedia contents that are originated from the TX side 12. The multimedia contents can include audio and video streams and be processed to present at the TX side 12 (such as cellphone, smartphone, PDA, and GPS navigation, or any other portable wireless device) having a phone-like screen 1202 and the TX side 12 is coupled to the RX side 10 via a network communication NC, which is preferably a wireless communication and a two-way communication. Noticeably, the multimedia contents may include video and audio data, i.e. the video data can be displayed on the screen 1202 while the audio data can be played via a speaker (not shown) in the TX side 12. Besides, the RX side 10 may be advantageously provided in a CPU-less (without central processing unit) and/or GPU-less (without graphical processing unit) environment for the sake of less power consumption and/or simplified circuit complexity.

As shown in FIG. 1A, the TX side 12 may be a computing system or mobile device equipped with CPU and/or GPU computing power, such as a PC, laptop, tablet PC, mobile phone, smart-phone, and may include a processor (not shown) for executing an application program (not shown) of an operation system (OS) 1204 installed in a storage medium (not shown) and a transceiver 1206 coupled to the processor and capable of transmitting and receiving the multimedia contents generated by the application program of OS 1204 executed by the processor. The OS 1204 may be any one of existing or known OS, such as the abovementioned Windows®, iOS®, Android®, Linux®, Blackberry®, Symbian®, Palm®, installed on the TX side 12 such that an application program may be performed or run thereon. The network communication NC between the RX side 10 and the TX side 12 may preferably be any one of the network communication standards or profiles of: IEEE 802.11, IEEE 802.16, CDMA2000, WCDMA, TD-SCDMA, LTE, TDLTE, Bluetooth, Zigbee and combination thereof, or wired communication such as ADSL network, Optical/Fiber network or Cable network.

The RX side 10 (refer back to FIG. 1A) includes a pad-like screen 1002 (e.g. touch panel), a coordinate mapping unit 1004 and a transceiver 1006. The screen 1002 is provided for detecting at least one touch signal, and is preferably larger than the screen 1202. The coordinate mapping unit 1004 can be controlled and/or controllable by an operating system (not shown). The coordinate mapping unit 1004 is provided for converting the at least one touch signal (from the screen 1002) into touch data associated with a first position information that indicates a virtual operation on the first screen 1002 corresponding to an actual operation on the second screen 1202, wherein the first position information is with respect to a first coordinate system of the first screen. For example, referred to FIG. 1B, the first position information represents a current cursor position (right side of FIG. 1B) on the pad-like screen 1202 moved by the user's finger (not shown), and thus the mirrored cursor on the phone-like screen 1202 will be moved to the corresponding position (left side of FIG. 1B) such that the user can do any operation on the phone-like screen by touching the pad-like screen 1202 while without touching the phone-like screen 1202. The transceiver 1006 is provided for transmitting the touch data (e.g. the first position information indicative of the current position of cursor on screen 1002) sent from the coordinate mapping unit 1004 to the TX side 12 via the network communication NC. On the other hand, the TX side 12 further includes a coordinate calculating unit 1208 for calculating a second position information (e.g. new cursor position on phone-like screen) with respect to a second coordinate system of the screen 1202 based on the first position information. For example, when the user "points and clicks" the new object on the touch screen 1002 (RX), and thus the same new object on the touch screen 1202 (TX) will be "pointed and clicked" simultaneously because an absolute position (x', y') of the same new object on the touch screen 1002 can be obtained as following expression:

the mapping absolute position $(x',y')$ on the phone-like screen=the current position $(x,y)\times$mapping ratio, where
mapping _ratio along x-axis=x-axis _resolution of phone-like screen/x-axis _resolution of pad-like screen;
mapping ratio _along y-axis=y-axis _resolution of phone-like screen/y-axis _resolution of pad-like screen;
given the same origin for both screens 1202 and 1002.

Alternatively, the mapping movement (delta _x', delta _y') on the phone-like screen can be obtained as following expression:

mapping movement (delta_$x'$,delta_$y'$) on the phone-like screen=current movement (delta_$x$,delta_$y$) on the pad-like screen$\times$mapping_ratio, where
delta_x=x1−x0; delta_y=y1−y0;
mapping_ratio along x-axis=x-axis resolution of phone-like screen/x-axis resolution of pad-like screen;
mapping_ratio along y-axis=y-axis resolution of phone-like screen/y-axis resolution of pad-like screen;
given the same origin for both screens 1202 and 1002,
where x0 and y0 represents the old position on the pad-like screen, and x1 and y1 represents the new position on the pad-like screen while each of the mapping ratios has a value less than one when the display size of the pad-like screen is larger than that of the phone-like screen. Thus, the operating system 1204 can be further provided for performing the actual operation at the second screen based on the second position information, such that the screen 1002 can display results from the actual operation. As a result, the RX side 10 can control multimedia contents played at TX side 12 in realtime fashion due to up-scale and down-scale operations by the coordinate mapping unit 1004 (RX side) and the coordinate calculating unit 1208 (TX side).

Noticeably, the first position information may further include the current position of the cursor on the pad-like screen 1002 of the RX side 10, and the resolution data of the RX side 10, e.g. 1920×1080, and the second position information can be calculated so as to obtain the mapping position of the cursor on the phone-like screen 1202, e.g. scaling down to a resolution 480×320. For example, the actual action can be "play a video movie" when the mapping position of the cursor on the screen 1202 is pointed on a "play" icon. As a result, the user can "touch" on the pad-like screen 1002 of the RX side 10 to implement operations without access to the phone-like screen 1202 as if what he/she usually does on the phone-like screen 1202 of the TX side 12. On the other hand, all the tasks requiring extensive computing power/resources are handled by the TX side 12, and only the display task is duplicated (mirrored) to the RX side 10 from the TX side 12 such that the multimedia contents can be presented in realtime fashion between the pad-like screen 1002 of the RX side and the phone-like screen 1202 of the TX side 12.

Figure 1B:
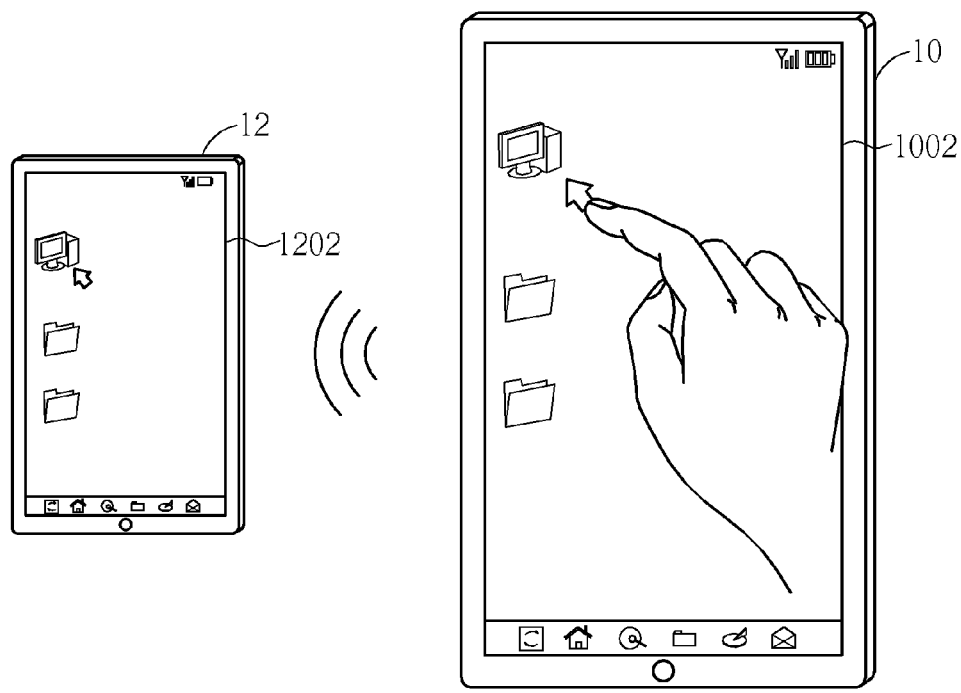
FIG. 1B and FIG. 1C are schematic diagrams showing touch control operations of from the RX side over the TX side shown in FIG. 1A according to an embodiment of the present invention.
Figure 1C:
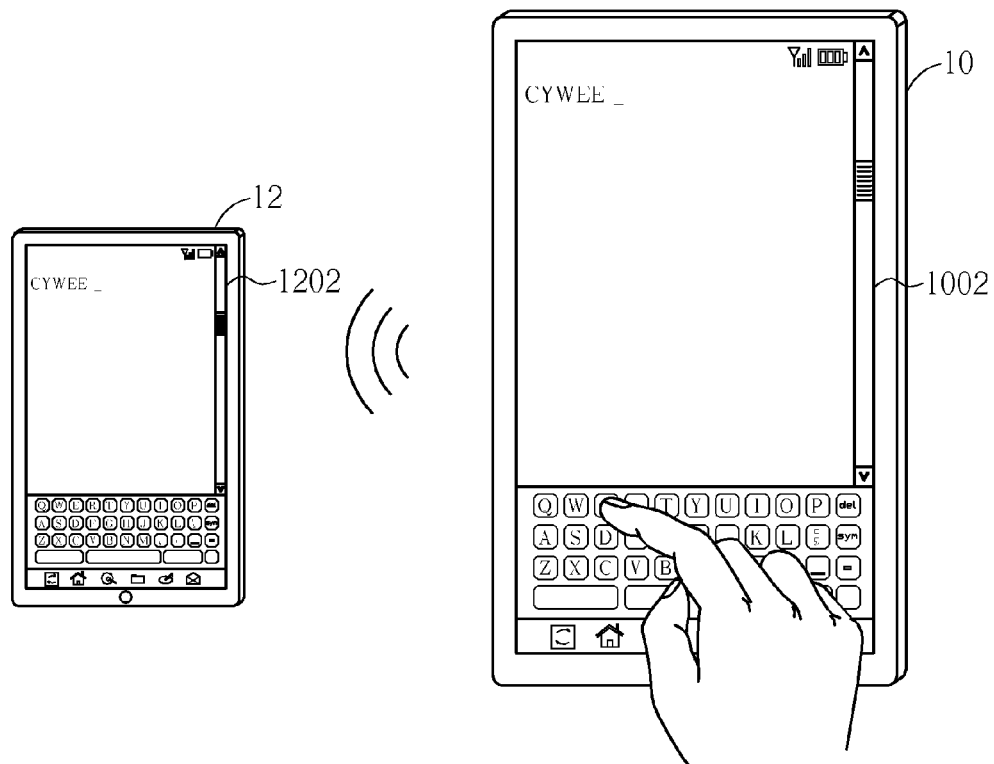

For example, please refer to FIG. 1B and FIG. 1C, which are schematic diagrams of touch control operations of the RX side 10 and the TX side 12 shown in FIG. 1A according to an embodiment of the present invention. As shown in FIG. 1B, a user can do the "open" operation to open a file or folder on the larger screen 1002 of the RX side 10 (right side) and quasi-simultaneously the smaller screen 1202 of the TX side 12 (left side) will mirror the same scene/image as that in the RX side 10, and thus the user can do the "double-click" operation to open some object like file/folder on the larger screen 1002 while utilize computing power from the TX side 12, i.e. the operating system 1204, to run the archive application. As shown in FIG. 1C, a user can do the "key-in" operation on the larger RX side 10 (right side) to type words and simultaneously the smaller screen 1202 of the TX side 12 (left side) will mirror the same scene/image as that in the RX side 10, and thus the user can do the "key-in" operation on the larger screen 1002 while utilize computing power from the TX side 12, i.e. the operating system 1204, to run the text-editing application.

In detail, please continue to refer to FIG. 1A, the TX side 12 may further include a compressing unit 1210, for compressing the multimedia contents with a compression ratio, e.g. compressing RGB data into MJPEG data, which requires less time for compression and thus facilitates operating in realtime fashion, and the transceiver 1206 can be further utilized for transmitting the compressed multimedia contents to the screen 1002 for displaying. Specifically, the transceiver 1006 receives the compressed multimedia contents from the transceiver 1206 via the network communication NC, and then compressed multimedia contents are decompressed by a decompressing unit 1010 with the compression ratio, such that the video data of the multimedia contents can be displayed on the screen 1002 while the audio data of the multimedia contents can be played by a speaker 1008. As a result, the multimedia contents can be displayed and controlled in realtime fashion between the screen 1002 of the RX side 10 and the screen 1202 of the TX side 12.

Figure 2:
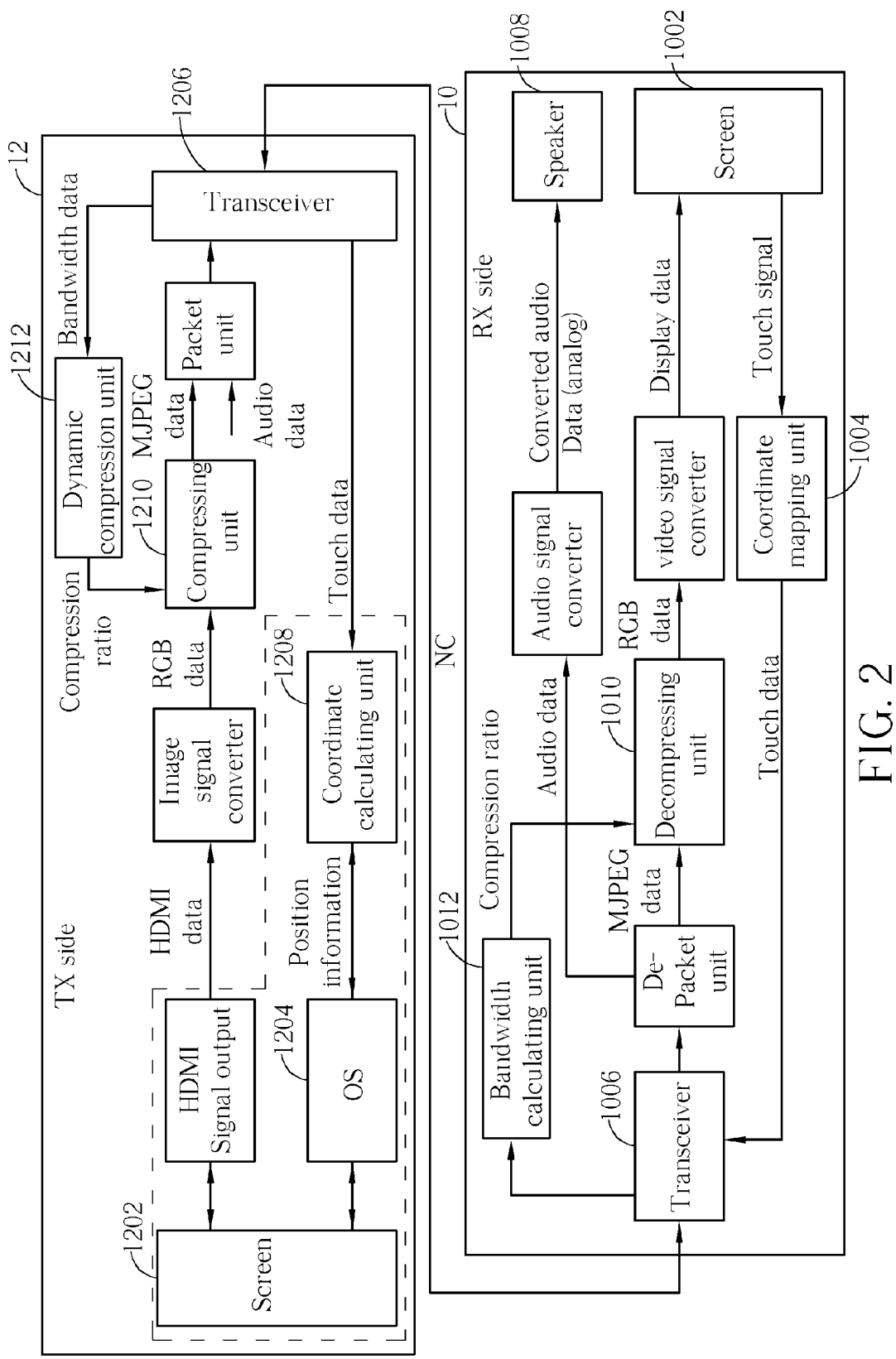
FIG. 2 is a schematic diagram showing a compression ratio in relation to an available bandwidth between the RX side and the TX side according to an alteration of the present invention.

Moreover, please refer to FIG. 2, which is a schematic diagram of the RX side 10 and the TX side 12 according to an alteration of the present invention. In the embodiment shown in FIG. 2, the transceiver 1206 can further detect a bandwidth of the network communication NC, and the TX side 12 further includes a dynamic compression unit 1212, for determining the compression ratio of the multimedia content based on the bandwidth of the network communication NC, such that the compressing unit 1210 can compress the multimedia contents at the compression ratio, which is determined by the bandwidth of the network communication NC. Correspondingly, the transceiver 1006 also can detect the bandwidth of the network communication NC, and then the decompressing unit 1010 decompresses the compressed multimedia contents by the compression ratio provided by a bandwidth calculating unit 1012. As a result, the multimedia contents can be compressed with a compression ratio according to a bandwidth of the network communication NC, such that the multimedia contents can be smoothly displayed in realtime fashion between the screen 1002 of the RX side 10 and the screen 1202 of the TX side 12 by facilitating the realtime codec function (e.g. the video compression ratio is determined by the actual available bandwidth). Besides, the transceiver 1006 (RX side) also can directly receive the compression ratio from the dynamic compression unit 1212 (TX side) rather than the bandwidth calculating unit 1012, and then to pass the compression ratio into the decompressing unit 1010 so that the bandwidth calculating unit 1012 can be removed as well.

Besides, the present invention discloses another method for controlling in realtime fashion multimedia contents between a RX side having a first touch panel and a TX side having a second touch panel via a network communication. The multimedia contents comprise at least a screen frame data (not shown) where the screen frame data includes the screen resolution data, image data displayed on the screen and audio data. The method comprising the steps of:

Step 1: detecting at least one touch signal from the second touch panel 1202, for example, the user may touch the touch-sensitive phone-like screen 1202 to do something, and the "touch" can be detected and a touch signal will be sent to OS for particular operation;

Step 2: in response to detecting the touch signal from the second touch panel, compressing the screen frame data on the TX side and transmitting to the RX side so that the RX side decompresses the compressed screen frame data so as to obtain a TX's resolution data, where the TX's resolution data is provided together with a RX's resolution data to scale the screen frame data so as to display the screen frame data to fit with the RX's touch panel;

Step 3: detecting at least one touch signal from the first touch panel;

Step 4: in response to detecting the touch signal from the first touch panel, the further steps including:

Step 4-1: converting the touch signal on the RX side into touch data associated with a first position information defining a virtual operation on the first screen corresponding to an actual operation on the second screen, the first position information being with respect to a first coordinate system of the first screen;

Step 4-2: transmitting the touch data from the RX side to the TX side via the network communication, and calculating on the TX side a second position information with respect to a second coordinate system of the second screen based on the first position information, and Step 4-3: performing the actual operation at the second screen based on the second position information; and Step 5: implementing an override mechanism to assign the TX side a higher priority overriding the RX side when the two detecting events (respectively from the TX and RX sides) occur simultaneously, for example, the phone-like screen 1202 will override the pad-like screen 1002 to take control when the user receives an incoming call from the phone-like screen 1202, and the override mechanism is implemented by a software program installed at the TX side. That means the TX side can dominant the RX side to facilitate the communication since the user has paid attention on doing the task at the TX side rather the RX side (e.g. pick-up the incoming call).

Figure 3A:
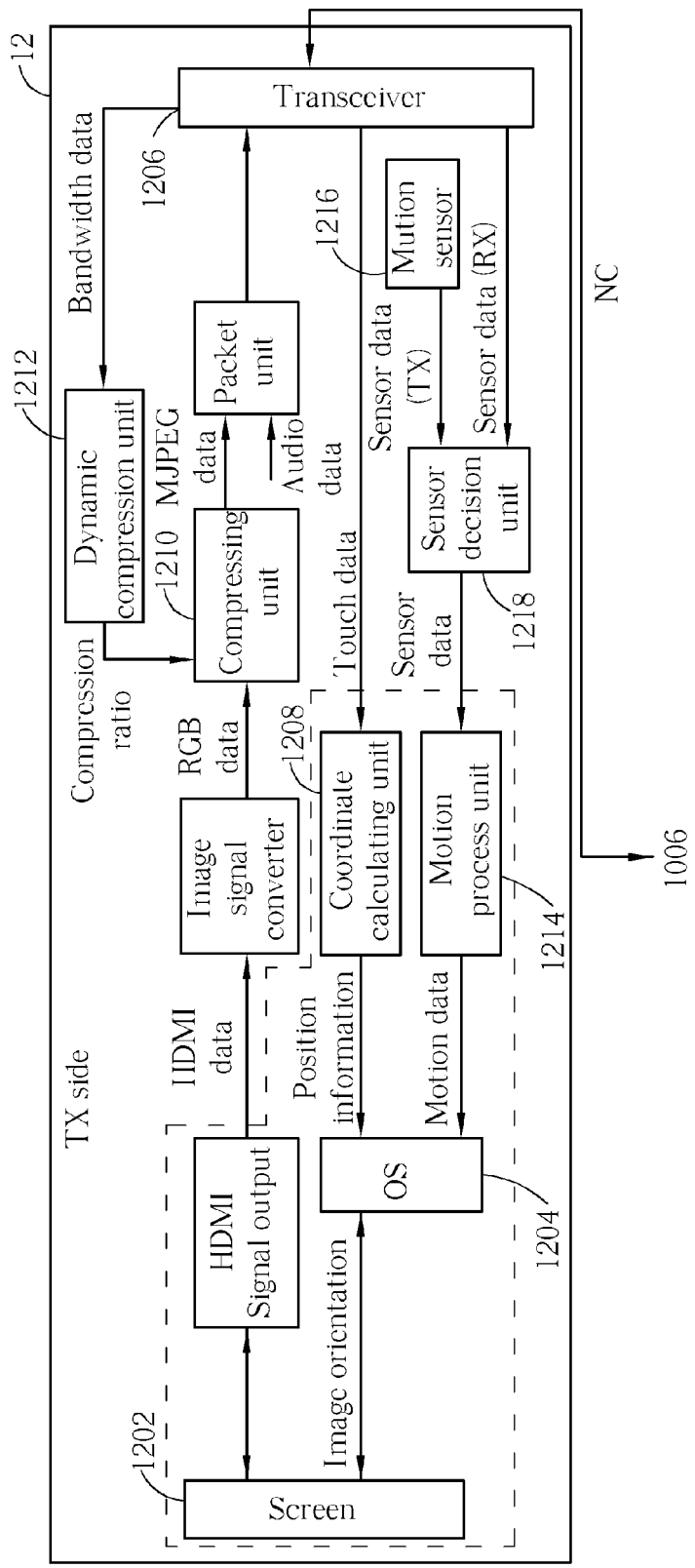
FIG. 3A and FIG. 3B are schematic diagrams showing an image orientation on the TX side in response to a motion detection on the RX side where
Figure 3B:
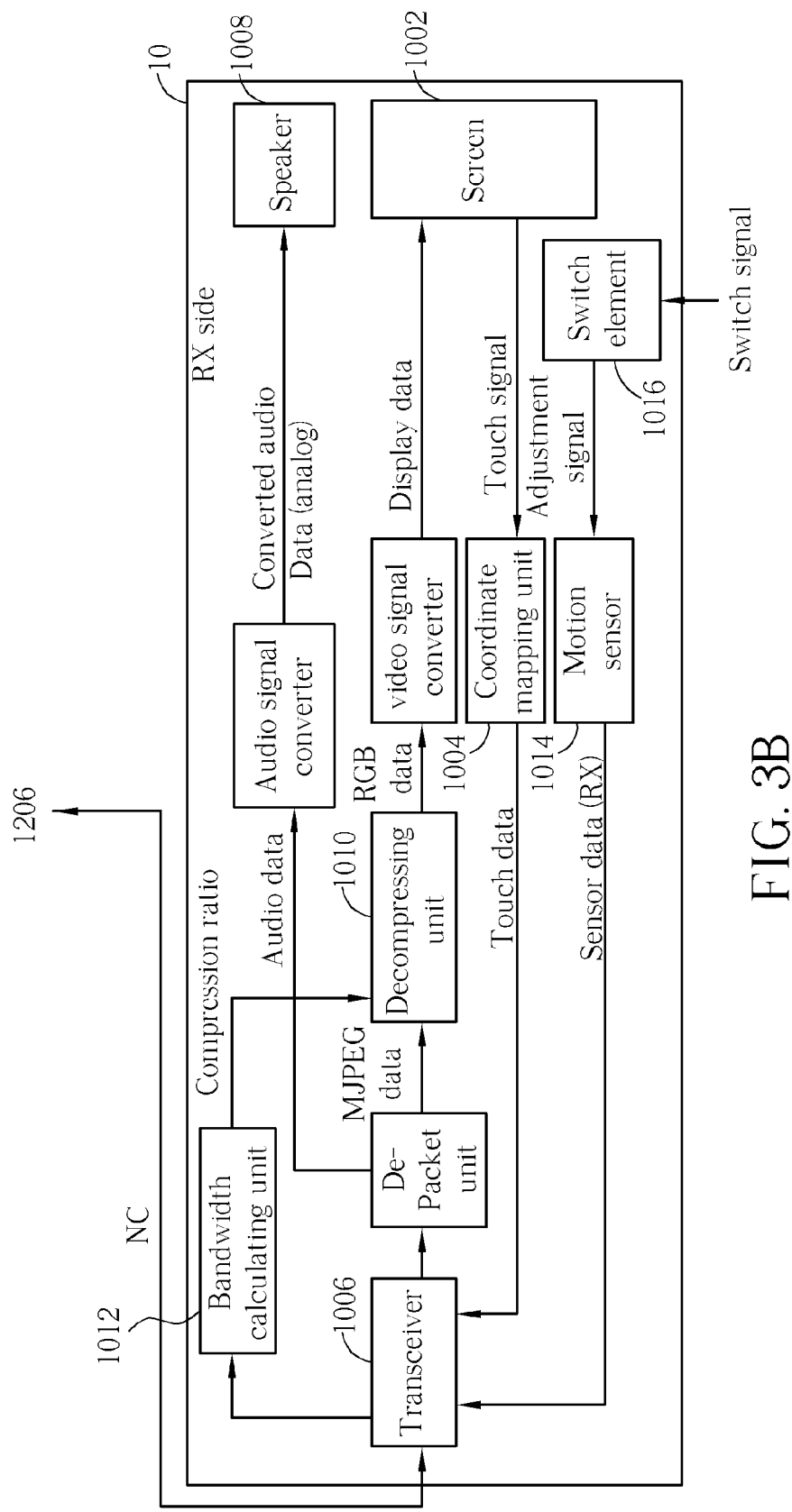

Furthermore, please refer to FIGS. 3A-3B, which are schematic diagrams of the TX side 12 and the RX side 10 according to another alteration of the present invention. In one embodiment shown in FIG. 3B, the RX side 10 may further include a motion sensor 1014 (including at least one of an accelerometer, a gyroscope and a magnetic compass) for detecting at least one motion event. The receiver 1006 transmits the sensor data (RX) from the motion sensor 1014 after the motion sensor 1014 has detected the motion event on the RX side, and then the sensor data (RX) is sent to the TX side 12 via the network communication NC. A sensor decision unit (TX) may disable sensor data (TX) generated from a motion sensor 1216 on the TX side 12 only if the detecting exists (i.e. the sensor data (RX) from the RX side has being received on the TX side), and then send the sensor data (RX) to a motion process unit 1214. The motion process unit 1214 can convert the sensor data (RX) into motion data (indicating a translation representative of linear acceleration in three-axis directions, and/or an angular rotation representative of Yaw, Roll and Pitch in three-axis directions) on the TX side 12, so as to present the multimedia contents on the screen 1202 and subsequently on the screen 1002 in a same particular orientation (e.g. portrait orientation or landscape orientation). The particular orientation is determined by the operating system 1204 according to the motion data (RX) such that the image at the screen 1202 will be presented at the landscape or portrait orientation. As a result, the multimedia contents can be displayed and controlled in realtime fashion between the screen 1002 of the RX side 10 and the screen 1202 of the TX side 12 through motion operations.

Figure 3C:
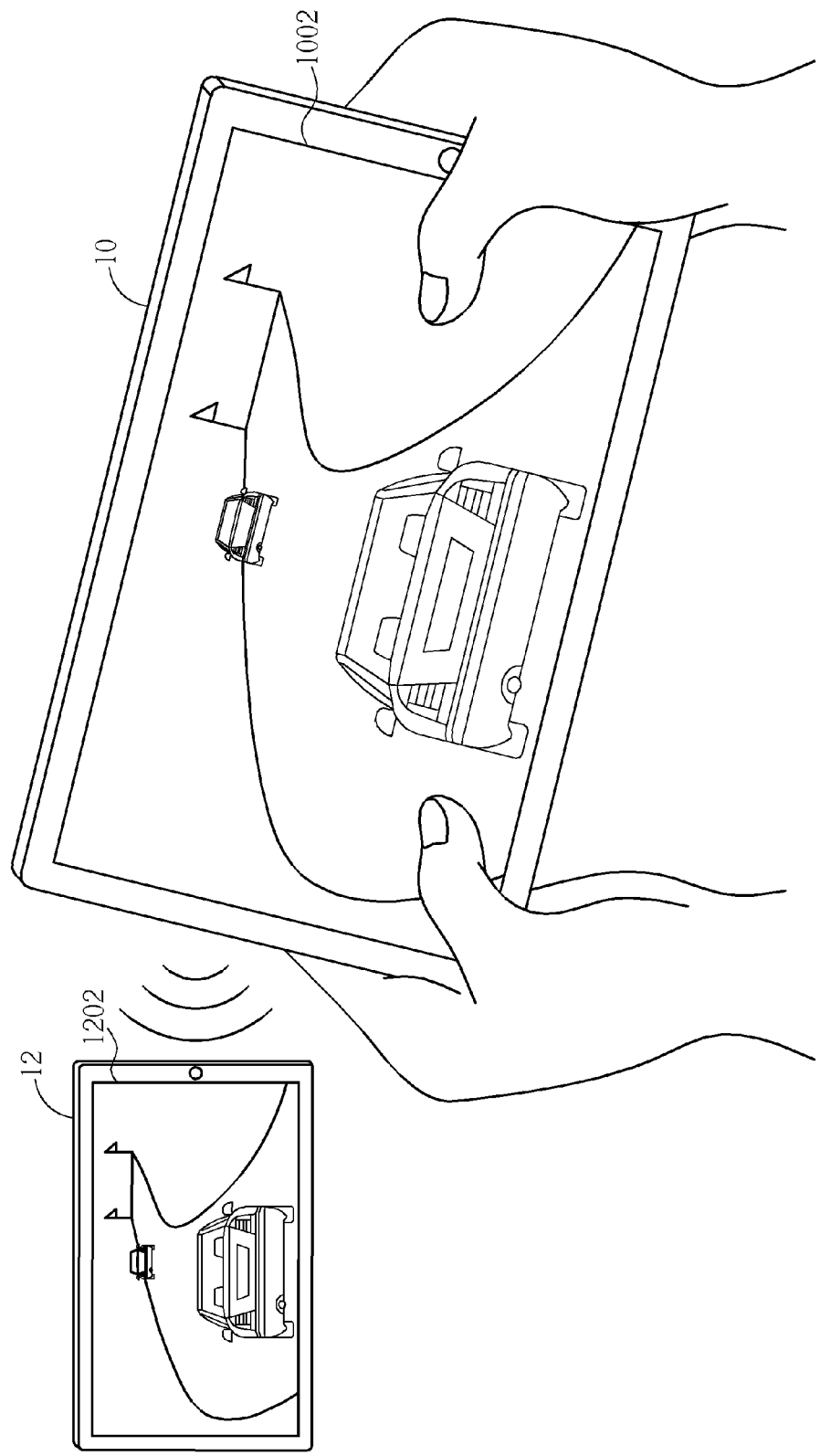
FIG. 3C is a schematic diagram showing motion control operations of the RX side over the TX side corresponding to FIGS. 3A and 3B according to an embodiment of the present invention.

For example, please refer to FIG. 3C, which is a schematic diagrams of motion control operations between the RX side 10 and the TX side 12 shown in FIGS. 3A-3B according to one embodiment of the present invention. As shown in the right side of FIG. 3C, a user can do the "game play" driving motion, e.g. moving the image (RX) of the larger pad-like screen 1002 from Landscape to Portrait, and thus the mirrored image (TX) on the smaller phone-like screen 1002 (shown on left side of FIG. 3C) is quasi-simultaneously adjusted from Landscape to Portrait on the TX side 12 performed by the operating system 1204 based on the motion data converted from the sensor data (RX) generated by the motion sensor 1014 (RX). Thus, the user can play the game on the pad-like screen 1002 while utilize computing power from the TX side 12, i.e. the operating system 1204, to run the game application actually on the phone-like screen 1202.

Noticeably, the motion sensor 1014 may have a plurality of sensing ranges, i.e. different sensing sensitivities, or a particular sensing range for generating the sensor data. When the motion sensor 1014 has a plurality of sensing ranges, one of the multiple sensing ranges can be selected by a control code determined by a switch signal so as to enable a motion chip to generate one motion data based on the selected sensing range determined by the control code.

In a first embodiment, the motion sensor 1014 has a plurality of sensing ranges. As shown in FIG. 3A-3B, the RX side 10 detects whether a switch signal is invoked by a switch element 1016 operative to a user, and the switch element 1016 may issue an adjustment signal to a motion chip (i.e. motion sensor 1014) after the switch signal was invoked (e.g. user turns the switch element 1016 on). Then, the motion sensor 1014 selects one of the plurality of sensing ranges of the motion chip based on the adjustment signal, and generates the motion data by the motion chip based on the selected sensing range so as to enable an interaction between the RX side 10 and the TX side 12. For example, the motion chip has a sensing range of ±1G at its "off" (original) state and ±2G at "on" state. When the switch element 1016 is turned to "on" from "off" by the user, the motion chip may have a new sensing range of ±2G, where G is defined as 9.81 m/s$^2$ for gravitational acceleration.

Figure 3D:
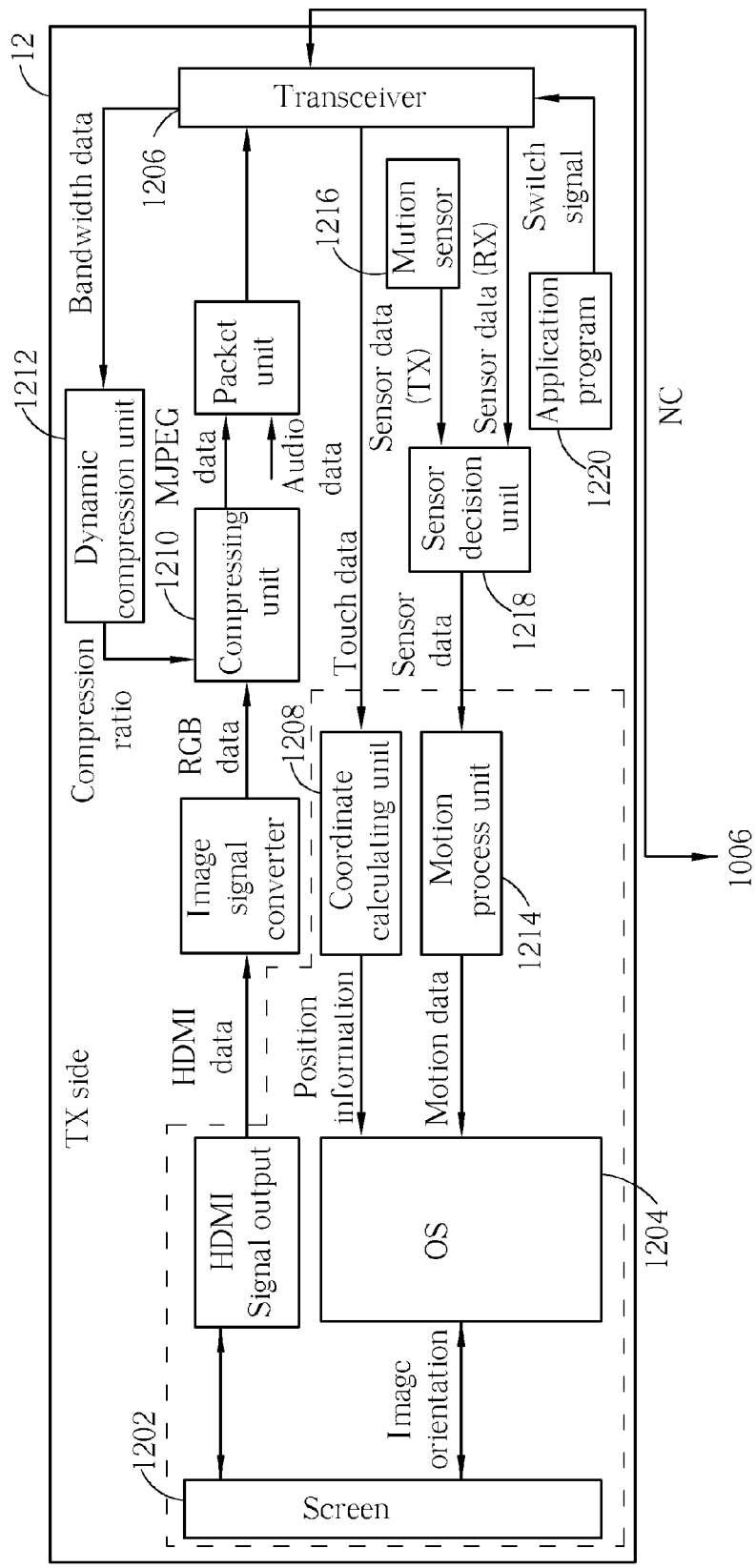
FIG. 3D and FIG. 3E are schematic diagrams showing adjustment of motion sensitivity on the RX side implemented by an application program on the TX side according to a further alteration of the present invention.
Figure 3E:
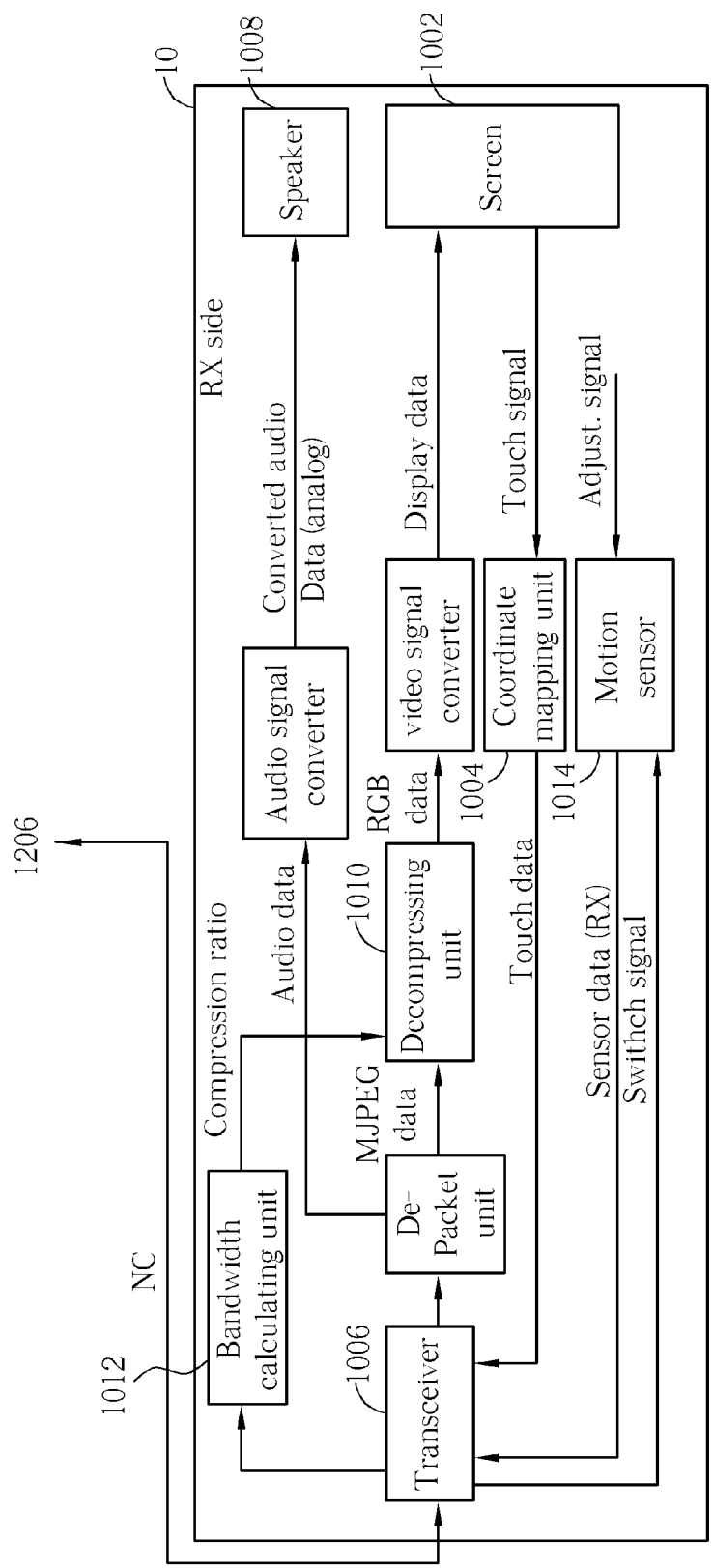

In a second embodiment, the motion sensor 1014 has a plurality of sensing ranges. As shown in FIG. 3D-3E, the TX side 12 detects whether a switch signal is invoked by an application program 1220 (e.g. game software/program), and an adjustment signal is generated in response to the invoked switch signal. Then, the motion sensor 1014 selects one of the plurality of sensing ranges of the motion chip of the motion sensor 1014 based on the adjustment signal, and generates the motion data by the motion chip based on the selected sensing range so as to enable an interaction between the RX side 10 and the TX side 12. For example, the game software may provide an input user interface to allow the user to choose one of three options for selecting particular sensing range among the plurality of sensing ranges where Option1 stands for ±1G; Option2 for ±2G; and Option3 for ±3G, respectively. A particular switch signal will be sent out to the RX side after the selected Option2 is chosen by the user, for instance. The motion sensor 1014 (RX) is requested to change its sensing range to ±2G directly by the switch signal, or by an adjusted signal in response to the switch signal.

Figure 3F:
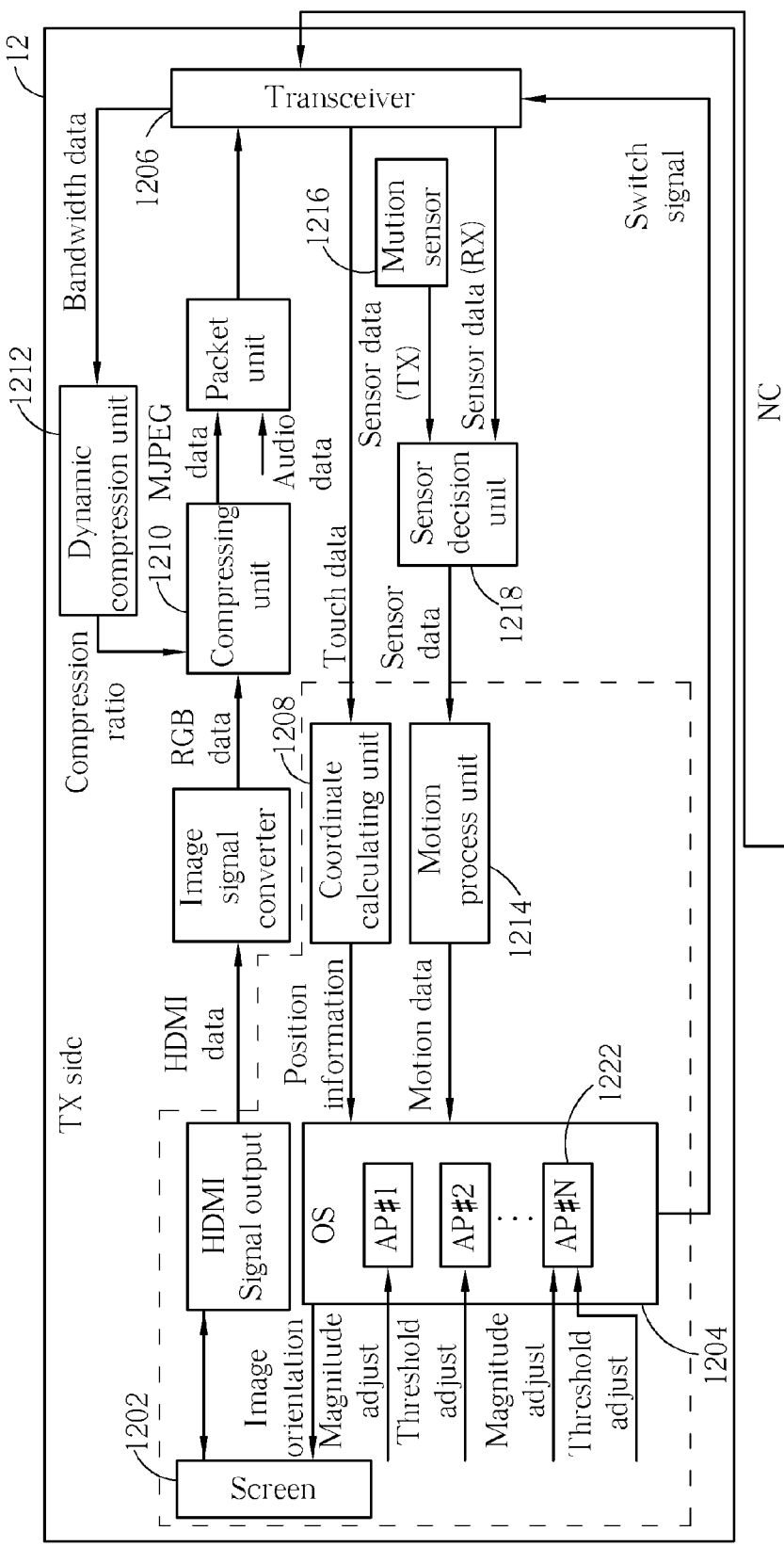
FIG. 3F and FIG. 3G are schematic diagrams showing adjustment of magnitude and/or threshold values of application programs on the TX side after motion data is received according to a further alteration of the present invention.
Figure 3G:
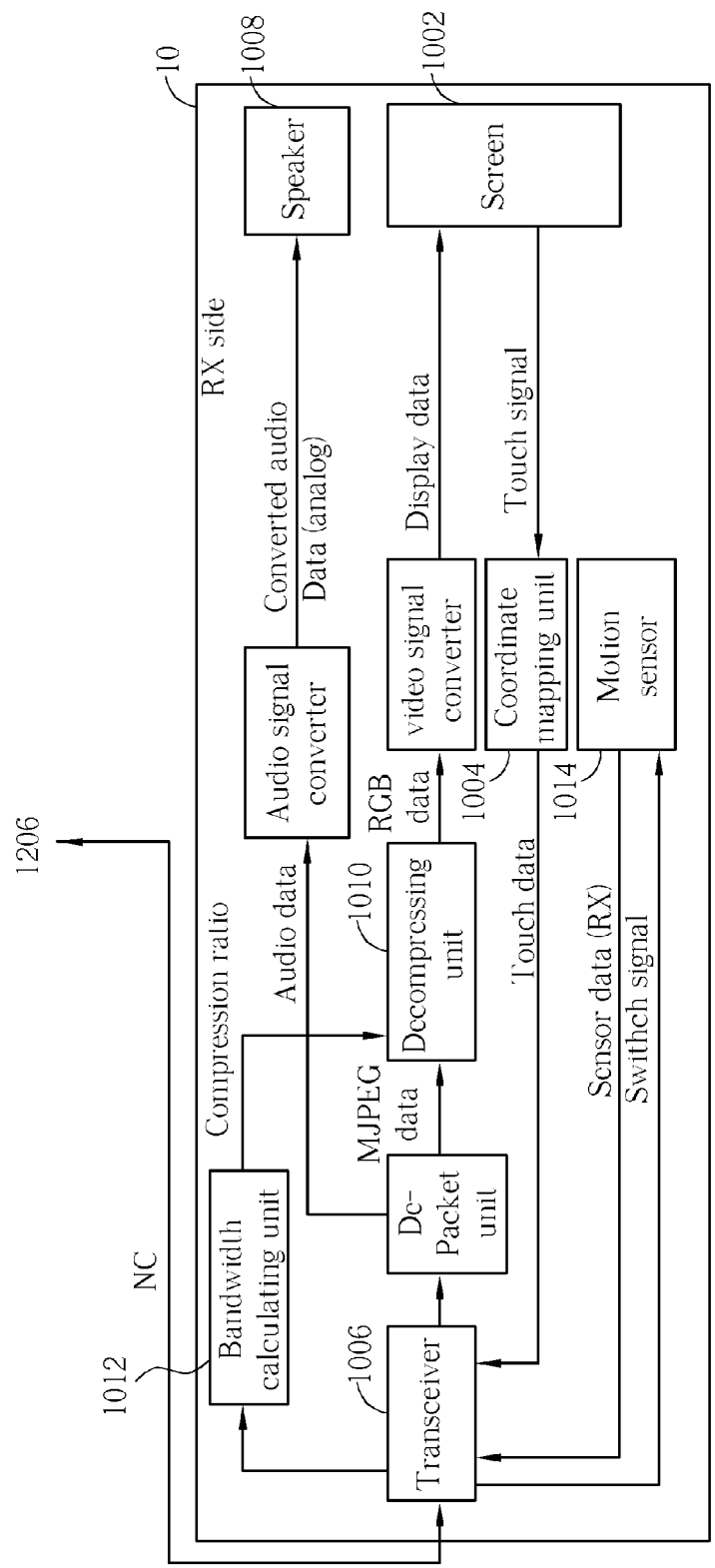

In a third embodiment, the motion sensor 1014 has a particular sensing range for generating the sensor data. As shown in FIG. 3F-3G, the TX side 12 detects whether a switch signal is invoked by an application program 1222 of the operating system 1204, and an adjustment signal is sent in response to the invoked switch signal. Then, the TX side 12 may provide a user interface to allow the user to adjust a threshold value of the application program 1222 (e.g. game software/program) based on either the adjustment signal or the invoked switch signal such that the threshold value of the application program 1222 can be increased at a ratio corresponding to the adjustment signal or the invoked switch signal. Subsequently, the motion data may be generated based on sensor data that is sent from the motion sensor 1014 (on the TX side) triggered by the switch signal, so as to enable an interaction between the RX side 10 and the TX side 12.

In a fourth embodiment, the motion sensor 1014 has a particular sensing range for generating the sensor data. As shown in FIG. 3D, the TX side 12 detects whether a switch signal is invoked by the application program 1222 of the operating system 1204, and issues an adjustment signal in response to the invoked switch signal. Then, the TX side 12 may provide a user interface to allow the user to adjust a magnitude of the motion data by means of increasing the magnitude's value at a ratio based on either the adjustment signal or the switch signal, so as to enable an interaction between the RX side 10 and the TX side 12. Noticeably, in the above third and fourth embodiment, the TX side 12 can be configured to adjust the threshold value of the application program 1222 and the magnitude of the motion data, respectively, but the TX side 12 can also simultaneously adjust the threshold value of the application program 1222 and the magnitude of the motion data, while retaining both merits.

Noticeably, the spirit of the present invention is to utilize a RX side to control multimedia contents played at transmitting entities of different types of operating systems in realtime fashion, wherein the RX side only transmits touch data and sensor data for a TX side to perform actual operation, and displays the multimedia contents of the TX side. Those skilled in the art should make modifications or alterations accordingly. For example, the RX side 10 can be foldable, portable, or any other types to meet each user's need (s).

Besides, the network communication NC may preferably include a Wi-Fi communication and a Bluetooth (BT) communication, and since the touch data and sensor data have less data volume while the multimedia contents have greater data volume, the touch data and the motion date are preferably transmitted to the TX side 12 via the BT communication, while the multimedia contents are preferably transmitted to the RX side 10 via the Wi-Fi communication. It can be understood that the transceiver 1006 and 1206 of the present invention may be a wireless module adapting other communication standards or profiles including such as IEEE 802.16 (WiMAX), CDMA2000, WCDMA, TD-SCDMA, LTE, TDLTE, Bluetooth-profile and combination thereof or a wired module.

Furthermore, the video data of the multimedia contents decompressed and outputted by the decompressing unit 1010 may preferably from a MJPEG format to a RGB format and transmitted or outputted to the screen 1002 in a LVDS format via a display interface converter such as a RGB-to-LVDS converter. It can be understood that other video stream formats such as HDMI and related interfaces may also be possible. On the other hand, the audio data of the multimedia contents processed and outputted may preferably be transmitted via an audio interface such as an I²S interface or standard and further to the speaker 1008.

Moreover, it is preferable that the multimedia contents transmitted and processed in video streaming may be made "real-time" or without significant delays with respect to time for the sake of low latency. In other words, in a preferred explanatory example of the present invention recited herein, the multimedia contents may be communicated between the RX side 10 and the TX side 12 and processed to output "real-time" video and audio streams to the screen 1002 and/or the speaker 1008 of the RX side 10 of the present invention. Preferably, the multimedia contents may be processed in video streaming (i.e. encoding and decoding) and communicated there between as data packets and the duration or delay of time involved in a "real-time" processing and transmission may be less than 100 ms for the sake of low latency; in one example, it may preferably be less than 10 ms, and in another example, it may approximately be 20 ms.

Figure 4:
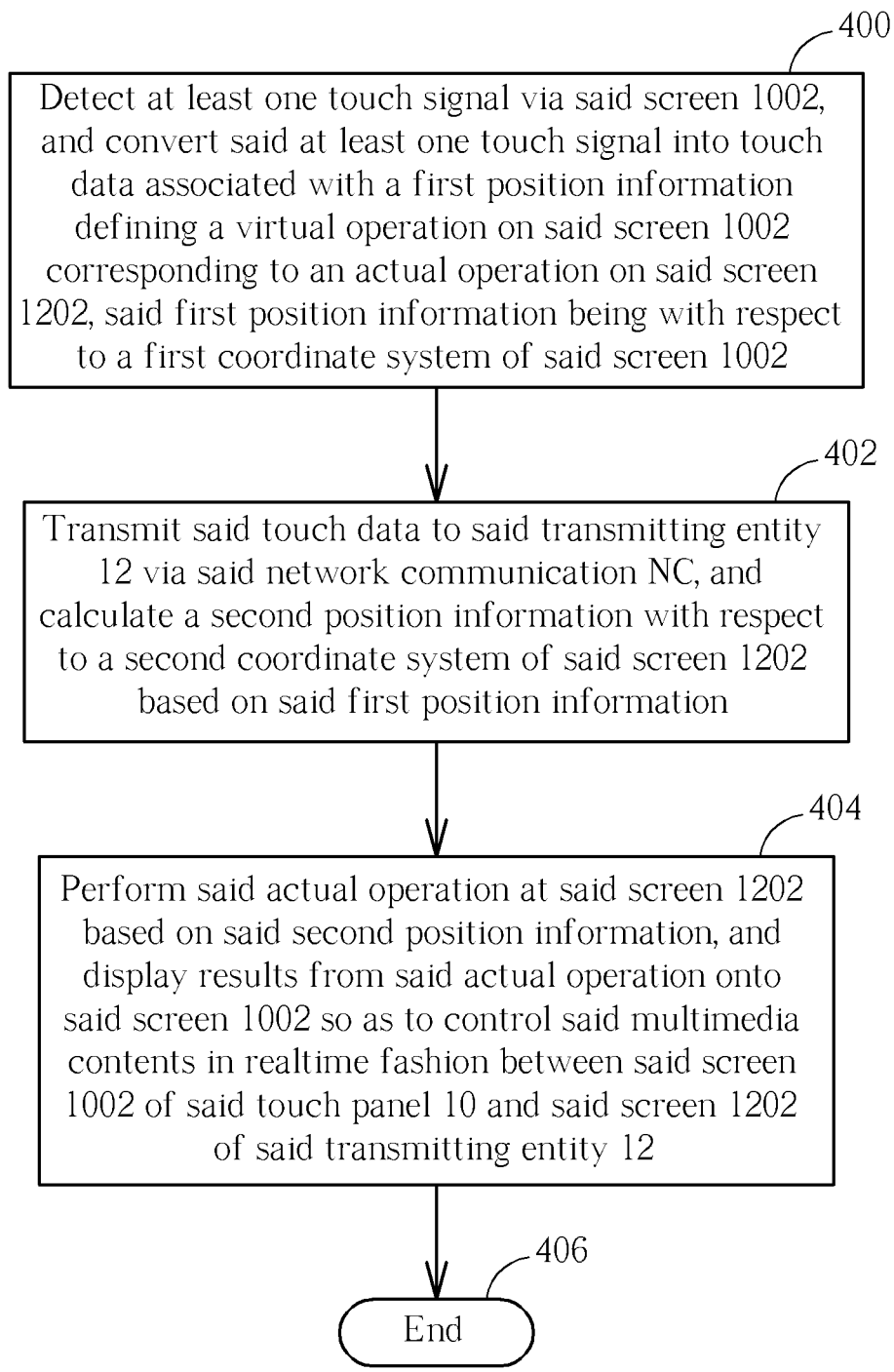
FIG. 4 is a flow diagram showing a process for controlling multimedia contents in realtime fashion according to an embodiment of the present invention.

Operations of the RX side 10 and the TX side 12 shown in FIG. 1A can be summarized into a controlling process 40 shown in FIG. 4. The controlling process 40 includes the following steps:

Step 400: Detect at least one touch signal via the screen 1002, and convert the at least one touch signal into touch data associated with a first position information defining a virtual operation on the screen 1002 corresponding to an actual operation on the screen 1202, the first position information being with respect to a first coordinate system of the screen 1002.

Step 402: Transmit the touch data to the TX side 12 via the network communication NC, and calculate a second position information with respect to a second coordinate system of the screen 1202 based on the first position information.

Step 404: Perform the actual operation at the screen 1202 based on the second position information, and display results from the actual operation onto the screen 1002 so as to control the multimedia contents in realtime fashion between the screen 1002 of the RX side 10 and the screen 1202 of the TX side 12.

Step 406: End.

Figure 5:
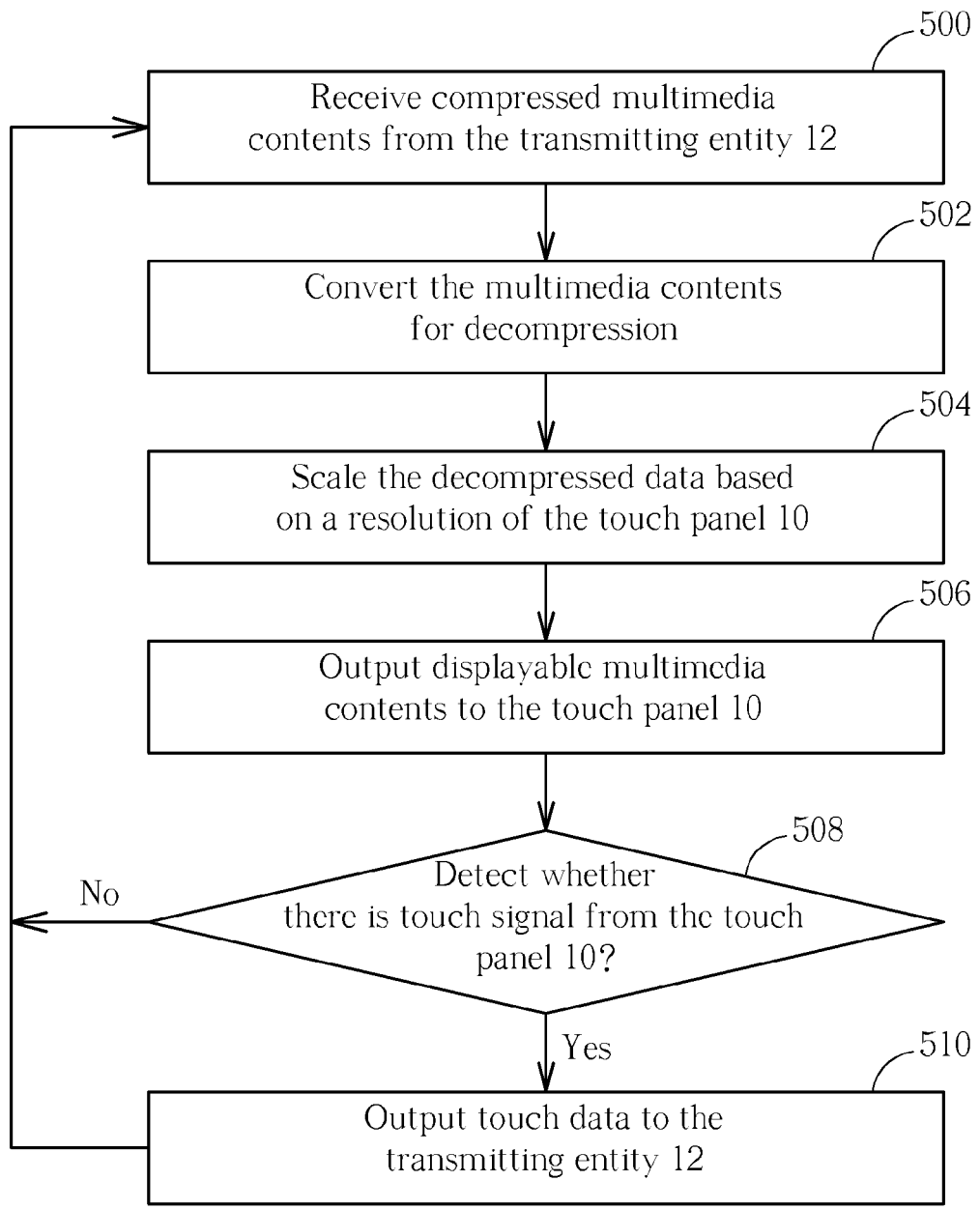
FIG. 5 is a flow diagram showing a process for compressing and decompressing multimedia contents in realtime fashion according to an embodiment of the present invention.

Operations of the RX side 10 shown in FIG. 1A can be summarized into a receiving process 50 shown in FIG. 5. The receiving process 50 includes the following steps:

Step 500: Receive compressed multimedia contents from the TX side 12.

Step 502: Convert the multimedia contents for decompression.

Step 504: Scale the decompressed data based on a resolution of the RX side 10.

Step 506: Output displayable multimedia contents to the RX side 10.

Step 508: Detect whether there is touch signal from the RX side 10. If yes, go to step 510; otherwise go to step 500.

Step 510: Output touch data to the TX side 12. Go to step 500.

Figure 6:
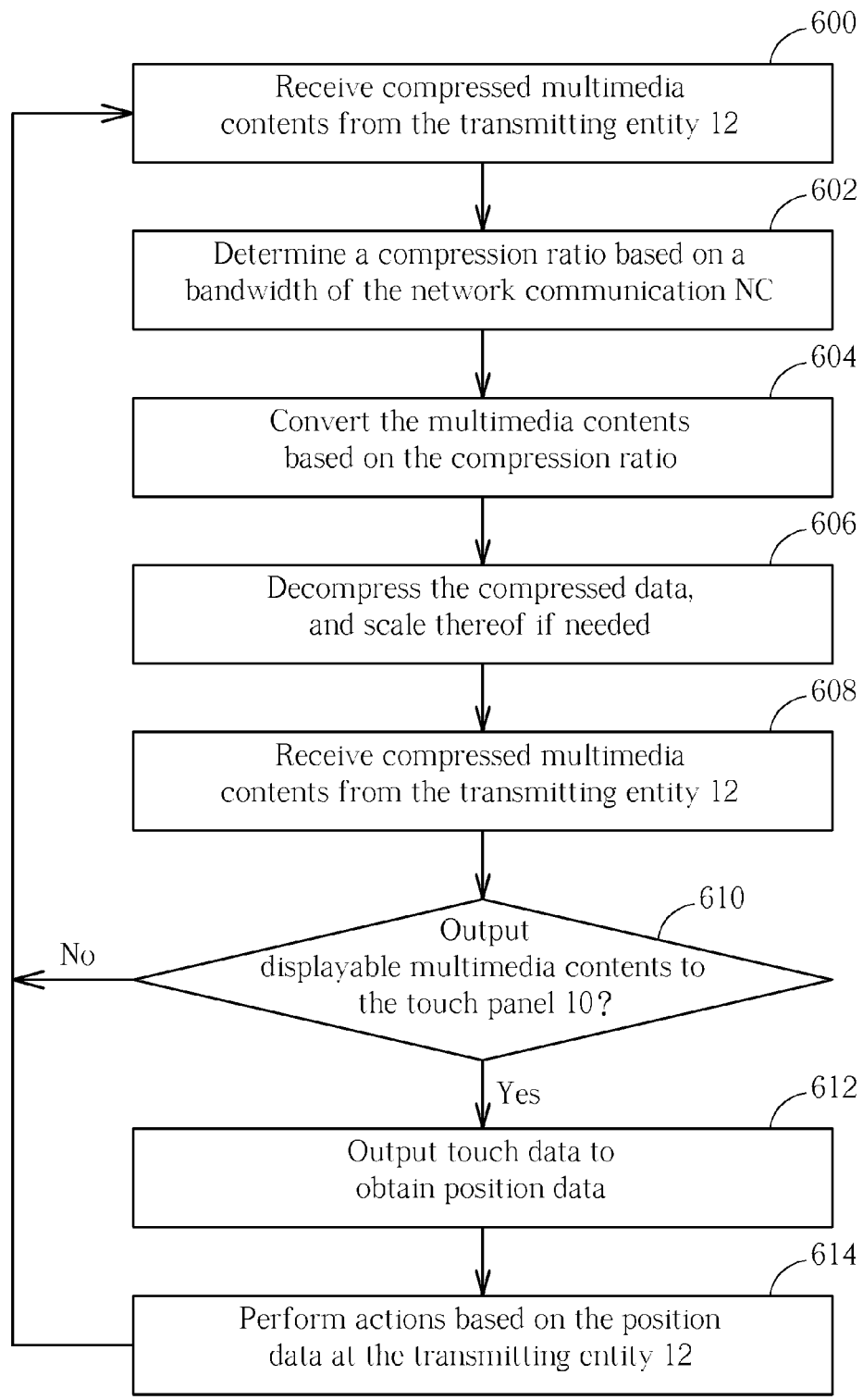
FIG. 6 is a flow diagram showing another process for compressing and decompressing multimedia contents in realtime fashion according to an embodiment of the present invention.

Operations of the RX side 10 and the TX side 12 shown in FIG. 2A can be summarized into a receiving and transmitting process 60 shown in FIG. 6. The receiving and transmitting process 60 includes the following steps:

Step 600: Receive compressed multimedia contents from the TX side 12.

Step 602: Determine a compression ratio based on a bandwidth of the network communication NC.

Step 604: Convert the multimedia contents based on the compression ratio.

Step 606: Decompress the compressed data, and scale thereof if needed.

Step 608: Output displayable multimedia contents to the RX side 10.

Step 610: Detect whether there is touch signal from the RX side 10. If yes, go to step 510; otherwise go to step 600.

Step 612: Output touch data to obtain position data.

Step 614: Perform actions based on the position data at the TX side 12. Go to step 600.

Detail descriptions of the controlling process 40, the receiving processes 50 and the receiving and transmitting process 60 can be derived by referring to the above description, and are not narrated hereinafter.

Figure 7A:
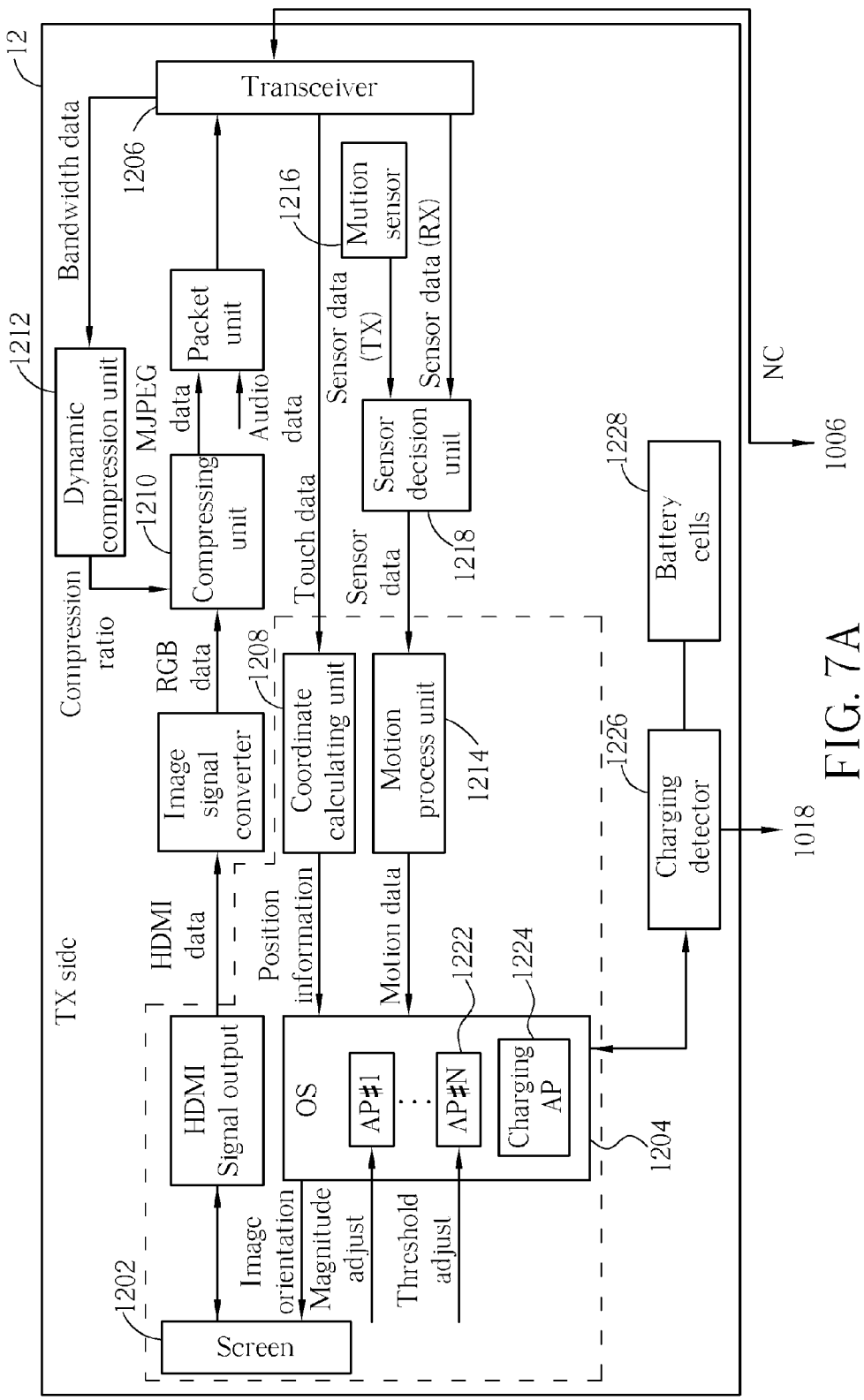
FIG. 7A and FIG. 7B are schematic diagrams showing battery charging between the TX side and the RX side according to a further alteration of the present invention.
Figure 7B:
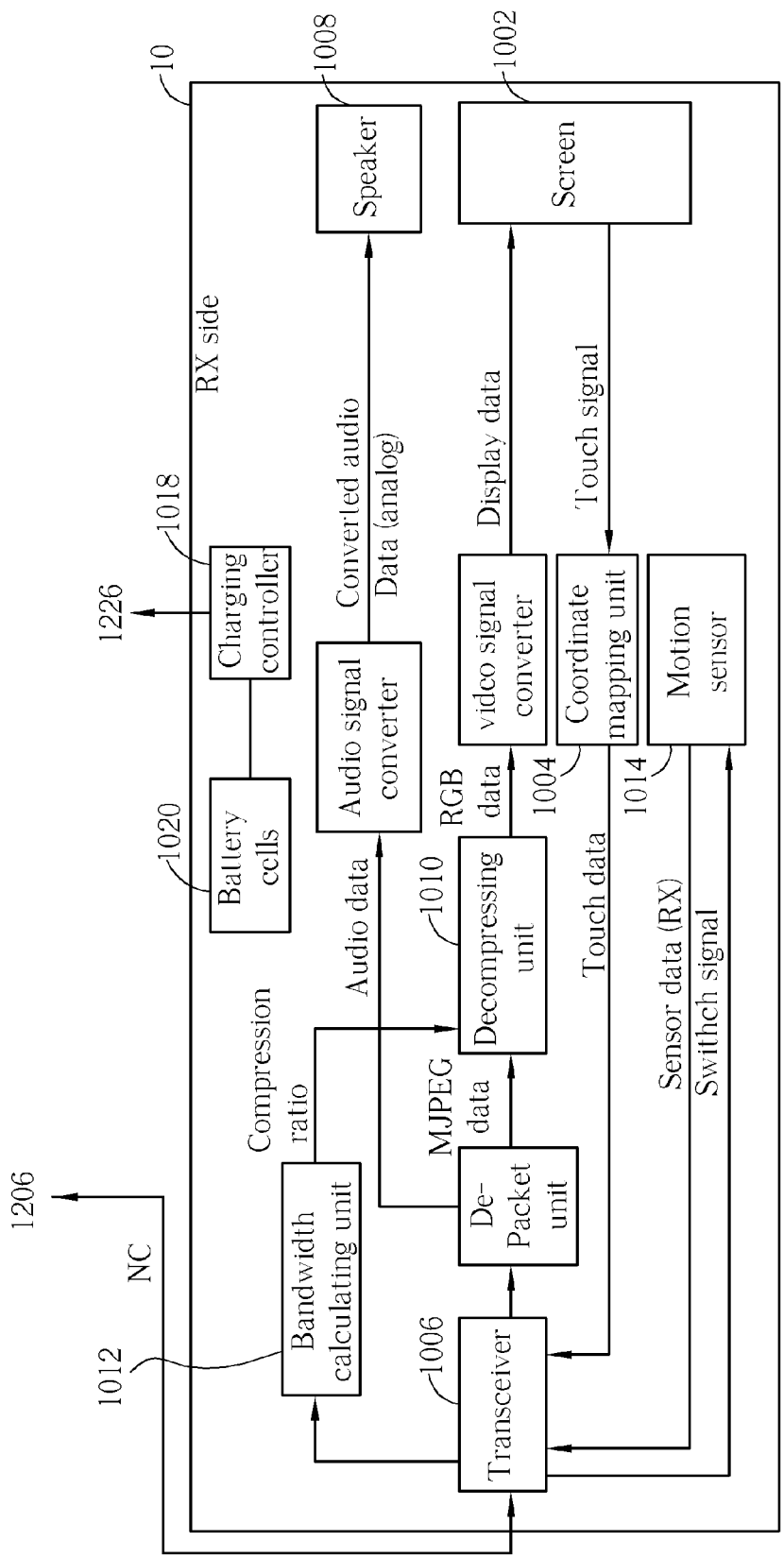

On the other hand, please refer to FIG. 7A-7B, which is a schematic diagram of the RX side 10 according to another alteration of the present invention. As shown in FIG. 7A-7B, the TX side 12 further comprises a charging application 1224, charging detector 1226 and battery cells 1228, and the RX side 10 further comprises a charging controller 1018 and battery cells 1020.

Figure 8:
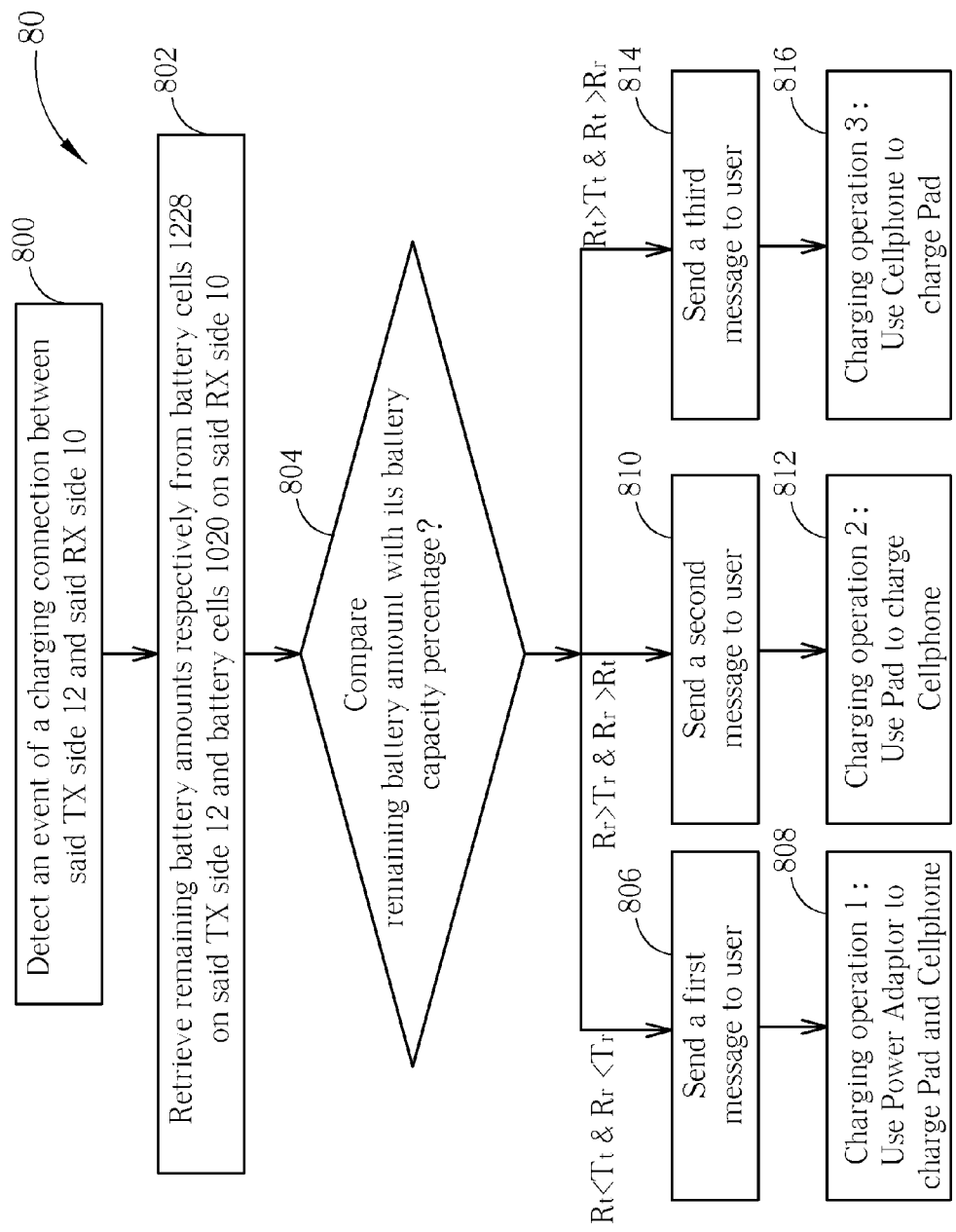
FIG. 8 is a flow diagram of a battery charging process according to an embodiment of the present invention.

In one embodiment, system default charging operations of the TX side 12 and the RX side 10 shown in FIG. 7A-7B can be summarized into charging process 80 as shown in FIG. 8. The charging process 80 includes the following steps:

Step 800: Detect an event of a charging connection between the TX side 12 and the RX side 10. The charging connection is advantageously provided for conforming to the USB standard. It is advantageously applicable to the two-way charging process.

Step 802: Retrieve remaining battery amounts (Rt and Rr) respectively from battery cells 1228 on the TX side 12 and battery cells 1020 on the RX side 10.

Step 804: Compare the two remaining battery amounts (Rt and Rr) respectively with two predetermined battery capacity percentages (Tt and Tr) by a power management mechanism that is executed by either the charging application 1224 in the operating system or the charging controller 1018. If each of the remaining battery amounts is below the predetermined battery capacity percentage (i.e. Rt<Tt and Rr<Tr), go to step 806; if the remaining battery amount of the RX side 10 is higher than its predetermined battery capacity percentage while the remaining battery amount of the RX side 10 is higher than that of the TX side 12 (i.e. Rr>Tr and Rr>Rt), go to step 810; if the remaining battery amount of the TX side 12 is higher than its predetermined battery capacity percentage while the remaining battery amount of the TX side 12 is higher than that of the RX side 10 (i.e. Rt>Tt and Rt>Rr), go to step 814.

Step 806: Send a first message of recharging information shown as "Please Use Power Adaptor to charge Pad and Cellphone".

Step 808: Charging operation 1: Use Power Adaptor to charge Pad and Cellphone.

Step 810: Send a second message of recharging information shown as "Please Use Pad to charge Cellphone".

Step 812: Charging operation 2: Use Pad to charge Cellphone.

Step 814: Send a third message of recharging information "Please Use Cellphone to charge Pad".

Step 816: Charging operation 3: Use Cellphone to charge Pad.

Figure 9:
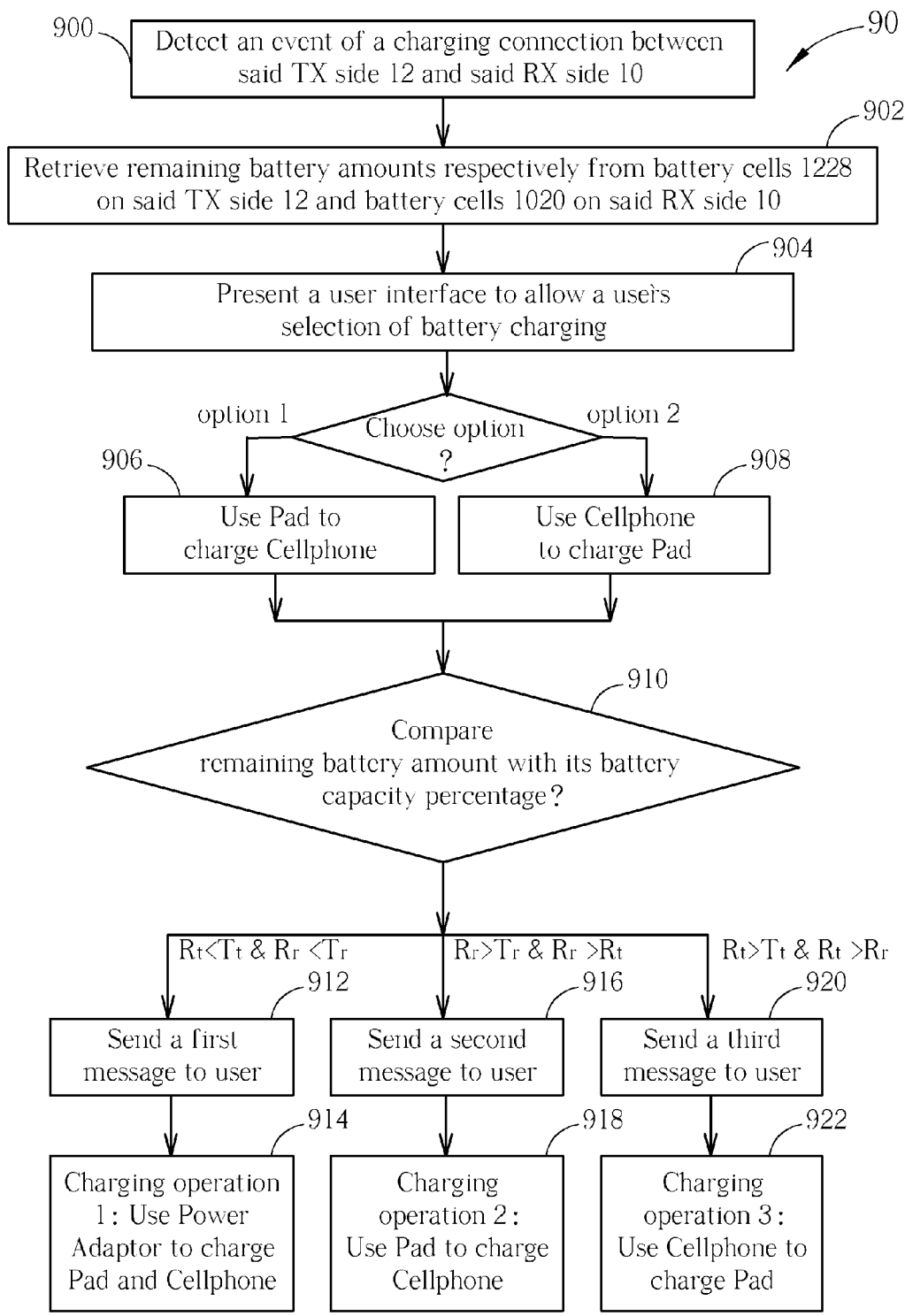
FIG. 9 is a flow diagram of a battery charging process according to another embodiment of the present invention.

In another embodiment, user selection charging operations of the TX side 12 and the RX side 10 shown in FIG. 7A-7B can be summarized into charging process 90 as shown in FIG. 9. The charging process 90 includes the following steps:

Step 900: Detect an event of a charging connection between the TX side 12 and the RX side 10. The charging connection is advantageously provided for conforming to the USB standard. It is also applicable to the two-way charging process.

Step 902: Retrieve remaining battery amounts (Rt and Rr) respectively from battery cells 1228 on the TX side 12 and battery cells 1020 on the RX side 10.

Step 904: Present a user interface to allow a user's selection of battery charging.

Step 905: If a user chooses option 1 for charging Cellphone, go to step 906; if the user chooses option 2 for charging Pad, go to step 908.

Step 906: Use Pad to charge Cellphone.

Step 908: Use Cellphone to charge Pad.

Step 910: Compare the two remaining battery amounts with two predetermined battery capacity percentages (Tt and Tr) by a power management mechanism that is executed by either the charging application 1224 in the operating system or the charging controller 1018. If each of the remaining battery amounts is below the predetermined battery capacity percentage (i.e. Rt<Tt and Rr<Tr), go to step 912; if the remaining battery amount of the RX side 10 is higher than its predetermined battery capacity percentage, and simultaneously the remaining battery amount of the RX side 10 is higher than that of the TX side 12 (i.e. Rr>Tr and Rr>Rt), go to step 916; if the remaining battery amount of the TX side 12 is higher than its predetermined battery capacity percentage, and simultaneously the remaining battery amount of the TX side 12 is higher than that of the RX side 10 (i.e. Rt>Tt and Rt>Rr), go to step 920.

Step 912: Send a first message of recharging information shown as "Please Use Power Adaptor to charge Pad and Cellphone".

Step 914: Charging operation 1: Use Power Adaptor to charge Pad and Cellphone. Come to END.

Step 916: Send a second message of recharging information shown as "Please Use Pad to charge Cellphone".

Step 918: Charging operation 2: Use Pad to charge Cellphone. Come to END.

Step 920: Send a third message of recharging information "Please Use Cellphone to charge Pad".

Step 922: Charging operation 3: Use Cellphone to charge Pad. Come to END.

The event of a charging connection can be detected either by a charging detector 1226 on the TX side 12 or by a charging controller 1018 on the RX side 10. The charging controller 1018 can be implemented by a power management chip. The charging detector 1226 can receive the remaining battery capacity of the battery cells 1228 on the TX side 12; so as to send the battery capacity information to the user interface by means of the charging application 1224 managed by OS 1204, and thus users can view the icon that indicates the actual measurement of the TX's battery capacity. The charging controller 1218 on the RX side 10 can receive the actual measurement of the RX's battery capacity, and sends the measurement to the charging detector 1226 on the TX side 12, so as to facilitate the charging detector 1226 to determine what condition can be meet to implement the appropriate charging operation.

For example, when each of the remaining battery amounts is below the predetermined battery capacity percentage (i.e. Rt<Tt and Rr<Tr), a power adaptor is used to charge both the RX side 10 and the TX side 12; when the remaining battery amount of the RX side 10 is higher than its predetermined battery capacity percentage, and simultaneously the remaining battery amount of the RX side 10 is higher than that of the TX side 12 (i.e. Rr>Tr and Rr>Rt), the RX side 10 is used to charge the TX side 12; when the remaining battery amount of the TX side 12 is higher than its predetermined battery capacity percentage, and simultaneously the remaining battery amount of the TX side 12 is higher than that of the RX side 10 (i.e. Rt>Tt and Rt>Rr), the TX side 12 is used to charge the RX side 10. It is noted that the RX side may be compulsorily switched to the power saving mode by the override mechanism when the user receives an incoming call from the TX side, that is, the user currently uses the TX side rather the RX side to either answer or dial the call. Therefore, it makes sense for the user to temporarily keep the RX side idle while he or she is busy for phone call.

In the prior art, a universal apparatus capable of communicating with the any example of new breed of electronic devices running any certain type of operating systems is lack. In comparison, the present invention utilizes a RX side to control multimedia contents played at transmitting entities of different types of operating systems in realtime fashion, wherein the RX side only transmits touch data and sensor data for a TX side to perform actual operation, and displays the multimedia contents of the TX side. Furthermore, the present invention can compress multimedia contents a bandwidth of network communication, such that the multimedia contents can be smoothly displayed in realtime fashion between the screen 1002 of the RX side 10 and the screen 1202 of the TX side 12. Besides, the TX side 12 can also be configured as a server having encoding hardware and the RX side 10 as a client having decoding hardware adapted for cloud computing environment running video streaming for the purpose of low latency requirement. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling in realtime fashion multimedia contents on a second screen on a transmit (TX) side from a first screen on a receive (RX) side wherein the multimedia contents comprises audio and video streams and is originated from the TX side and then is sent to the RX side via a network communication; and wherein the first screen is a touch panel, the method comprising:

detecting at least one touch signal via the first screen, and converting the at least one touch signal into touch data associated with a first position information defining a virtual operation on the first screen corresponding to an actual operation on the second screen, the first position information being with respect to a first coordinate system of the first screen;

transmitting the touch data from the RX side to the TX side via the network communication, and calculating on the TX side a second position information with respect to a second coordinate system of the second screen based on the first position information; and performing the actual operation at the second screen based on the second position information, so as to allow the RX side to control in realtime fashion the multimedia contents at the TX side, wherein the multimedia contents is sufficiently formed by one screen frame data instead of requiring the multimedia contents configured in a segment comprising of a plurality of screen frames.

2. The method of claim 1, wherein the multimedia contents is compressed at a compression ratio on the TX side and decompressed at a decompressed ratio determined by the compression ratio on the RX side.

3. The method of claim 2 further comprising:
detecting a bandwidth of the network communication so as to determine the compression and decompression ratios of the multimedia content.

4. The method of claim 2, wherein the RX side is provided in a CPU-less and/or GPU-less environment.

5. The method of claim 1, further comprising:
detecting at least one motion event from a motion sensor of the touch panel at the RX side;
transmitting at least one sensor data corresponding to at least one motion event to the TX side via a wireless network communication; and
disabling sensor data generated from a motion sensor at the TX side in response to the detecting and then converting the sensor data generated from the RX side to motion data at the TX side, so as to present the multimedia contents on the second screen and subsequently on the first screen in a same particular orientation, the particular orientation being determined by the motion data.

6. The method of claim 5, wherein the particular orientation is a portrait orientation.

7. The method of claim 5, wherein the particular orientation is a landscape orientation.

8. The method of claim 5, wherein the motion data comprises a translation representative of linear acceleration in three-axis directions.

9. The method of claim 5, wherein the motion data comprises an angular rotation representative of Yaw, Roll and Pitch in three-axis directions.

10. The method of claim 5, wherein the motion sensor is selected from the group consisting of an accelerometer, a gyroscope and a magnetic compass.

11. The method of claim 10, wherein each the motion sensor has a plurality of sensing ranges.

12. The method of claim 11, further comprising:
detecting whether a switch signal is invoked by a switch element operative to a user at the RX side, and issuing an adjustment signal to a motion chip at the RX side in response to the invoked switch signal; and
selecting one of the plurality of sensing ranges of the motion chip based on the adjustment signal; and
generating the motion data by the motion chip based on the selected sensing range so as to enable an interaction between the RX side and the TX side.

13. The method of claim 10, further comprising:
detecting whether a switch signal is invoked by an application program at the TX side, and issuing an adjustment signal to a motion chip at the RX side in response to the invoked switch signal;
selecting one of the plurality of sensing ranges of the motion chip based on the adjustment signal; and
generating the motion data by the motion chip based on the selected sensing range so as to enable an interaction between the RX side and the TX side.

14. The method of claim 11, wherein one of the plurality of sensing ranges is selected by a control code so as to enable a motion chip to generate the at least one motion data based on the selected sensing range.

15. The method of claim 10, wherein each the motion sensor has a particular sensing range.

16. The method of claim 15, further comprising:
detecting whether a switch signal is invoked by an application program at the TX side, and issuing an adjustment signal in response to the invoked switch signal; and
adjusting a threshold value of the application program by means of increasing the threshold value at a ratio corresponding to the adjustment signal so as to enable an interaction between the RX side and the TX side.

17. The method of claim 15, further comprising:
detecting whether a switch signal is invoked by an application program at the TX side, and issuing an adjustment signal in response to the invoked switch signal; and
adjusting a magnitude of the motion data by means of increasing the magnitude's value at a ratio corresponding to the adjustment signal so as to enable an interaction between the RX side and the TX side.

18. The method of claim 1, further comprising:
(a) detecting an event of a charging connection between the TX side and the RX side;
(b) retrieving first and second remaining battery amounts respectively from first battery cells on the TX side and second battery cells on the RX side;
(c) comparing the two remaining battery amounts with two predetermined battery capacity percentages by a power management mechanism so as to select one of the following steps:
(c-1) sending a first message of recharging information when each of the remaining battery amounts is below the predetermined battery capacity percentage thereof;
(c-2) sending a second message of recharging information when the remaining battery amount of the RX side is higher than its predetermined battery capacity percentage, and simultaneously the remaining battery amount of the RX side is higher than that of the TX side; or
(c-3) sending a third message of recharging information when the remaining battery amount of the TX side is higher than its predetermined battery capacity percentage, and simultaneously the remaining battery amount of the TX side is higher than that of the RX side; and
(d) implementing a charging operation between the TX and RX sides if an occurrence of one of the recharging messages is determined.

19. The method of claim 1, further comprising:
(a) detecting an event of a charging connection between the TX side and the RX side;
(b) retrieving first and second remaining battery amounts respectively from first battery cells on the TX side and second battery cells on the RX side;
(c) presenting a user interface to allow a users selection of battery charging;
(d) comparing the two remaining battery amounts with two predetermined battery capacity percentages by a power management mechanism so as to select one of the following steps:
(d-1) sending a first message of recharging information when each of the remaining battery amounts is below the predetermined battery capacity percentage thereof;
(d-2) sending a second message of recharging information when the remaining battery amount of the RX side is higher than its predetermined battery capacity percentage, and simultaneously the remaining battery amount of the RX side is higher than that of the TX side; or
(d-3) sending a third message of recharging information when the remaining battery amount of the TX side is higher than its predetermined battery capacity percentage, and simultaneously the remaining battery amount of the TX side is higher than that of the RX side; and (e) implementing a charging operation between the TX and RX sides if an occurrence of one of the recharging messages is determined.

20. A method for controlling in realtime fashion multimedia contents between a receive (RX) side having a first touch panel and a transmit (TX) side having a second touch panel via a network communication, the method comprising:

configuring the multimedia contents comprising at least one screen frame data, wherein the multimedia contents is sufficiently formed by one screen frame data instead of requiring the multimedia contents configured in a segment comprising of a plurality of screen frames;

detecting at least one touch signal from the second touch panel; in response to detecting the touch signal from the second touch panel, compressing the screen frame data on the TX side and transmitting to the RX side so that the RX side decompresses the compressed screen frame data so as to obtain a TX's resolution data, wherein the TX's resolution data is provided together with a RX's resolution data to scale the screen frame data so as to display the screen frame data to fit with the RX's touch panel;

detecting at least one touch signal from the first touch panel; in response to detecting the touch signal from the first touch panel, converting the touch signal on the RX side into touch data associated with a first position information defining a virtual operation on the first screen corresponding to an actual operation on the second screen, the first position information being with respect to a first coordinate system of the first screen; transmitting the touch data from the RX side to the TX side via the network communication, and calculating on the TX side a second position information with respect to a second coordinate system of the second screen based on the first position information, and performing the actual operation at the second screen based on the second position information;

and implementing an override mechanism to assign the TX side a higher priority overriding the RX side when the two detecting events occur simultaneously.

* * * * *